(12) United States Patent
Fukunaga

(10) Patent No.: US 8,958,637 B2
(45) Date of Patent: Feb. 17, 2015

(54) IMAGE PROCESSING APPARATUS, IMAGE PROCESSING METHOD, AND COMPUTER READABLE MEDIUM

(75) Inventor: Masakazu Fukunaga, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 637 days.

(21) Appl. No.: 13/309,396

(22) Filed: Dec. 1, 2011

(65) Prior Publication Data

US 2012/0301026 A1 Nov. 29, 2012

(30) Foreign Application Priority Data

May 27, 2011 (JP) ................. 2011-119034

(51) Int. Cl.
*G06K 9/00* (2006.01)
*H04N 1/60* (2006.01)

(52) U.S. Cl.
CPC ........... *H04N 1/6027* (2013.01); *H04N 1/6086* (2013.01)
USPC ........................................................ 382/167

(58) Field of Classification Search
None
See application file for complete search history.

(56) References Cited

U.S. PATENT DOCUMENTS

| 6,694,051 | B1 * | 2/2004 | Yamazoe et al. | 382/167 |
|---|---|---|---|---|
| 8,681,385 | B2 * | 3/2014 | Matsumoto | 358/3.26 |
| 2002/0021839 | A1 | 2/2002 | Takahashi | |
| 2002/0033830 | A1 * | 3/2002 | Yamakawa | 345/600 |
| 2004/0022434 | A1 * | 2/2004 | Yamazoe et al. | 382/168 |
| 2005/0012963 | A1 * | 1/2005 | Yamads | 358/2.1 |
| 2007/0065007 | A1 * | 3/2007 | Yamazoe et al. | 382/167 |
| 2007/0229863 | A1 | 10/2007 | Ono et al. | |
| 2008/0024845 | A1 * | 1/2008 | Makino et al. | 358/538 |
| 2010/0027072 | A1 | 2/2010 | Enjuji | |
| 2012/0301026 | A1 * | 11/2012 | Fukunaga | 382/167 |
| 2012/0301033 | A1 * | 11/2012 | Fukunaga | 382/195 |
| 2012/0301034 | A1 * | 11/2012 | Fukunaga | 382/195 |
| 2014/0099027 | A1 * | 4/2014 | Watanabe et al. | 382/167 |

FOREIGN PATENT DOCUMENTS

| JP | 2003-069824 A | 3/2003 |
|---|---|---|
| JP | 2005-341527 A | 12/2005 |
| JP | 3426189 B | 7/2008 |
| JP | 2009-290660 A | 12/2009 |
| JP | 2009-290661 A | 12/2009 |

OTHER PUBLICATIONS

Office Action issued in corresponding Australian Patent Application No. 2011254016 dated Jan. 9, 2013.

* cited by examiner

*Primary Examiner* — Sean Motsinger
(74) *Attorney, Agent, or Firm* — Sughrue Mion, PLLC

(57) ABSTRACT

An image processing apparatus includes the following elements. A receiving device receives an image. An estimating device estimates, for each of pixels within the image received by the receiving device, on the basis of the received image, an amount of fog, which is a difference between a luminance value of the pixel and an original luminance value of the pixel. A measuring device measures, for each of the pixels within the received image, a chroma value of the pixel. A determining device determines a correction target value for luminance values of pixels of a background portion within the received image. A correcting device corrects the chroma value of the pixel measured by the measuring device on the basis of the amount of fog estimated by the estimating device, the correction target value determined by the determining device, and a distance from the chroma value to an achromatic color.

8 Claims, 34 Drawing Sheets

FIG. 3
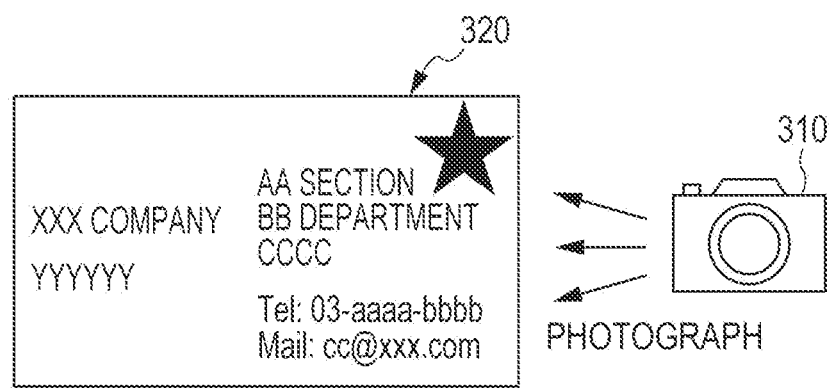
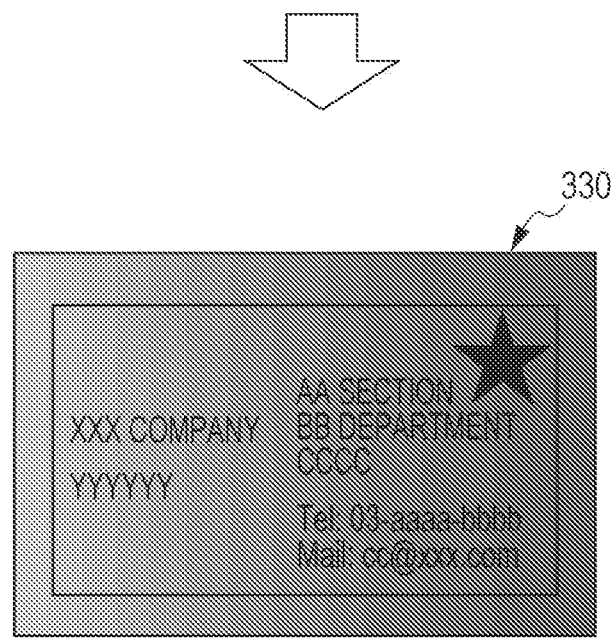

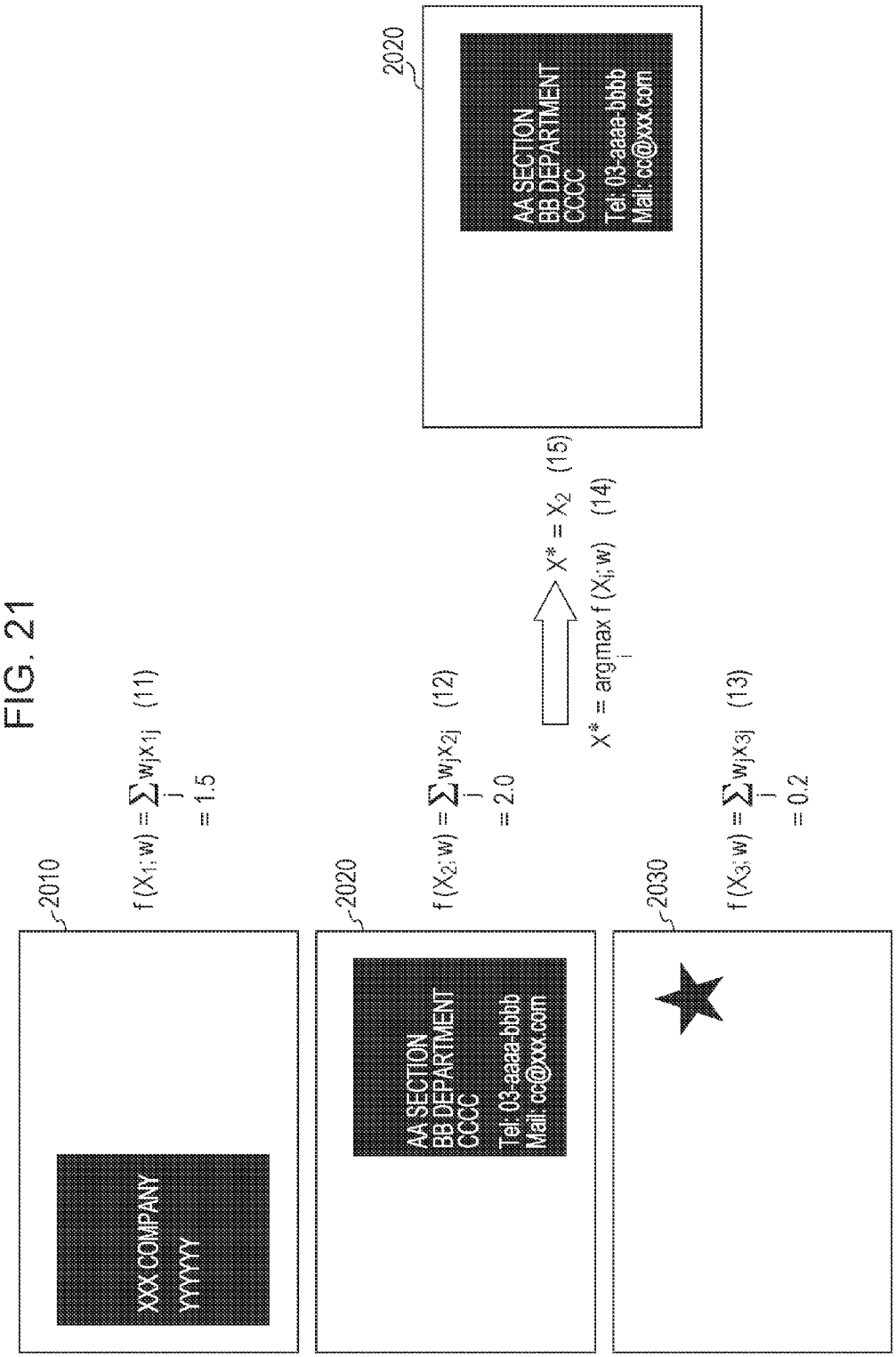

$$r_i(x; \alpha_i, \beta_i) = \alpha_i + \beta_i x \quad (17)$$

$$c_j(y; \gamma_j, \delta_j) = \gamma_j + \delta_j x \quad (16)$$

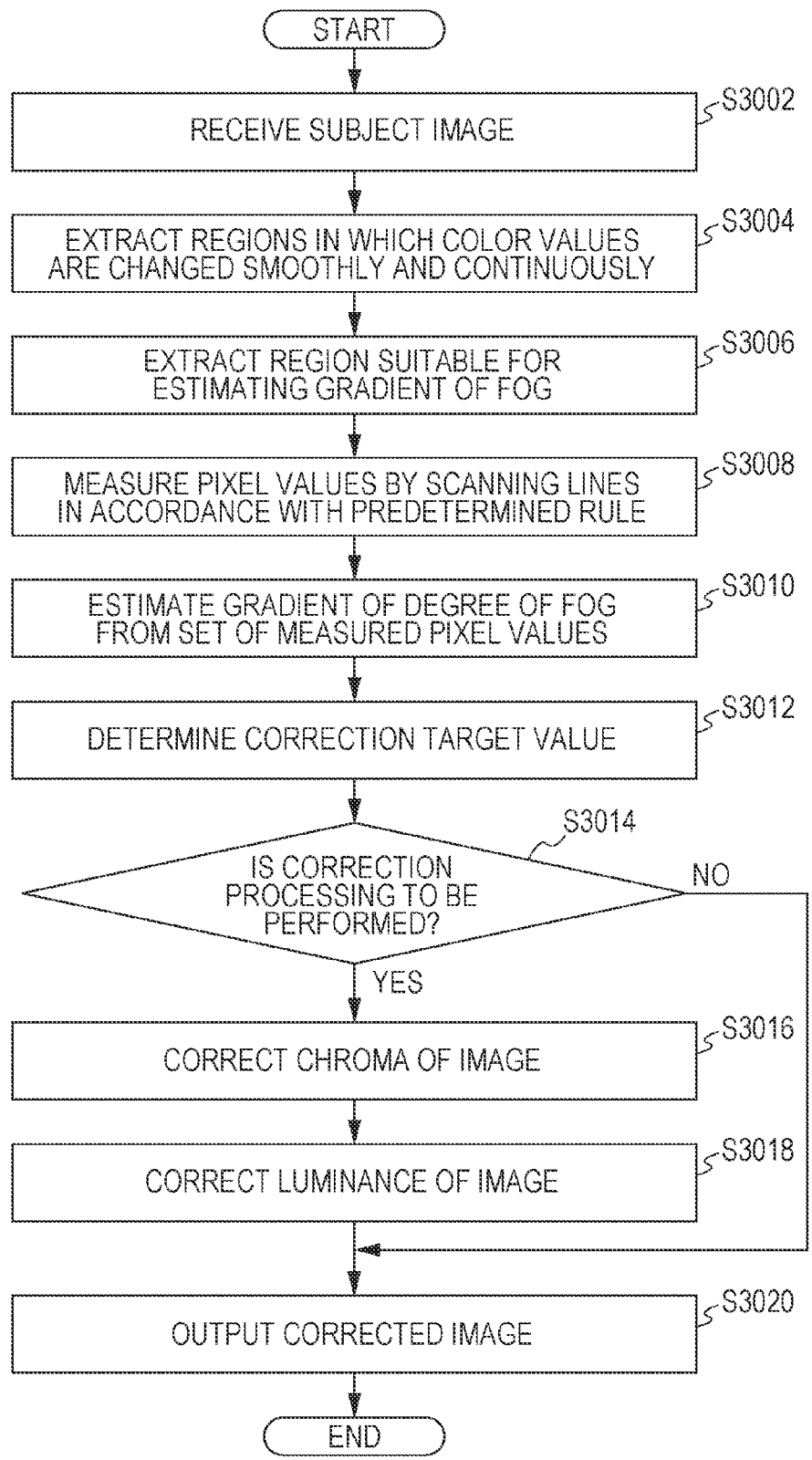

IMAGE PROCESSING APPARATUS, IMAGE PROCESSING METHOD, AND COMPUTER READABLE MEDIUM

CROSS-REFERENCE TO RELATED APPLICATIONS

This application is based on and claims priority under 35 USC 119 from Japanese Patent Application No. 2011-119034 filed May 27, 2011.

BACKGROUND

Technical Field

The present invention relates to image processing apparatuses, image processing methods, and computer readable media.

SUMMARY

According to an aspect of the invention, there is provided an image processing apparatus including: a receiving device that receives an image; an estimating device that estimates, for each of pixels within the image received by the receiving device, on the basis of the image received by the receiving device, an amount of fog, which is a difference between a luminance value of the pixel and an original luminance value of the pixel; a measuring device that measures, for each of the pixels within the image received by the receiving device, a chroma value of the pixel; a determining device that determines a correction target value for luminance values of pixels of a background portion within the image received by the receiving device; and a correcting device that corrects the chroma value of the pixel measured by the measuring device on the basis of the amount of fog estimated by the estimating device, the correction target value determined by the determining device, and a distance from the chroma value to an achromatic color.

BRIEF DESCRIPTION OF THE DRAWINGS

Exemplary embodiment(s) of the present invention will be described in detail based on the following figures, wherein:

FIG. 3 illustrates an example of processing performed by an image receiving module;

FIG. 21 illustrates an example of processing performed by an inspection-region selecting module;

FIG. 30 is a flowchart illustrating an example of processing according to the sixth exemplary embodiment;

DETAILED DESCRIPTION

In order to facilitate the understanding of exemplary embodiments of the invention, a technology, which is a basis for exemplary embodiments of the invention, will first be described.

Figure 31A:
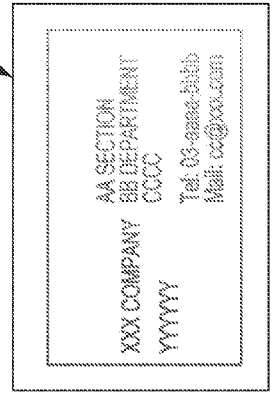
FIGS. 31A through 33F illustrate an example of a technology, which serves as a basis for the exemplary embodiments.
Figure 31C:
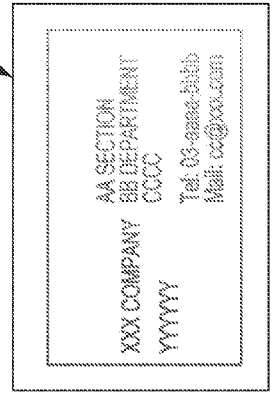

In FIG. 31A, a subject document 3100 to be photographed is a name card and contains, not only a black and white portion, but also a chromatic color portion. More specifically, a graphic shown at the top right of the subject document 3100 is a red mark (logo). The subject document 3100 is photographed by using, for example, a digital camera, resulting in a photographed image 3130 shown in FIG. 31C. The photographed image 3130 shows that image deterioration, such as a fog image 3120 shown in FIG. 31B, has occurred and is superposed on the photographed image 3130. There are various reasons why the fog image 3120 is generated, such as non-uniformity of illumination, taking a picture facing toward the light, the position of the subject document 3100 (i.e., positional relationship among the subject document 3100, illumination, and an image capturing device), and the configuration of the lenses of a digital camera (e.g., the center portion of an image is brighter, while the peripheral portion thereof is darker). FIG. 31B shows that the fog image 3120 is a gradation image in which the right side is a dark black and the left side is white, i.e., the shade of the color progressively changes. Accordingly, in the photographed image 3130 shown in FIG. 31C, although the right side is a dark black, the left side is close to the image of the original subject document 3100. This fog is also referred to as "shadow" or "black fog".

Fog images may be generated, not only by the use of a digital camera, but also by the use of a scanner. For example, in a so-called flatbed scanner, a pivotable pressure plate is provided on contact glass, and after setting a document on the contact glass, the pressure plate is closed and the document is scanned. Documents to be scanned include not only sheet-like documents, but also book-like documents (books, booklets, etc.). Such a book-like document is also set on the contact glass and is scanned. However, the binding portion of such a document is elevated above the contact glass, and is separated from the focal plane. As a result, image deterioration called "fog" occurs in the resulting scanned image corresponding to a position at which the binding portion of the document has been set.

A description will now be given of exemplary embodiments of the invention with reference to the accompanying drawings.

First Exemplary Embodiment

Figure 1:
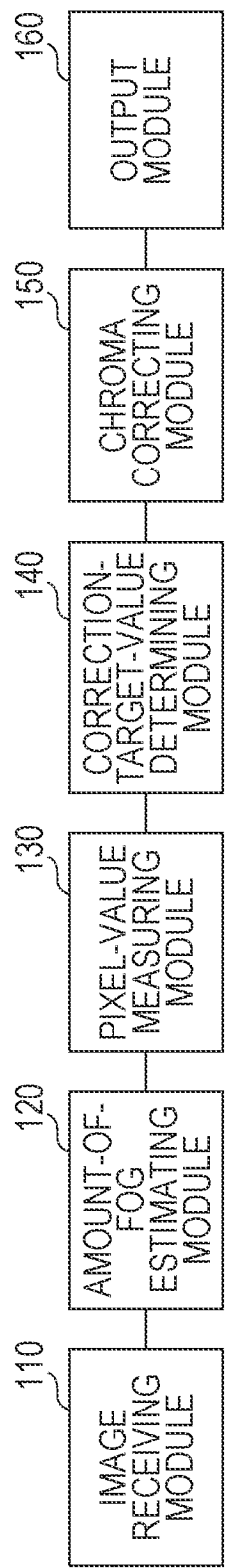
FIG. 1 is a block diagram illustrating conceptual modules forming an image processing apparatus according to a first exemplary embodiment.

FIG. 1 is a block diagram illustrating conceptual modules forming an image processing apparatus according to a first exemplary embodiment.

Generally, modules are software (computer programs) components or hardware components that can be logically separated from one another. Accordingly, the modules of exemplary embodiments of the invention are not only modules of a computer program, but also modules of a hardware configuration. Accordingly, the exemplary embodiments will also be described in the form of a computer program for allowing a computer to function as those modules (a program for causing a computer to execute program steps, a program for allowing a computer to function as corresponding units, a computer program for allowing a computer to implement corresponding functions), a system, and a method. While expressions such as "store", "storing", "being stored", and equivalents thereof are used for the sake of description, such expressions indicate, when the exemplary embodiments relate to a computer program, storing the computer program in a storage device or performing control so that the computer program is stored in a storage device. Modules may correspond to functions based on a one-on-one relationship. In terms of implementation, however, one module may be constituted of one program, or plural modules may be constituted of one program. Conversely, one module may be constituted of plural programs. Additionally, plural modules may be executed by using a single computer, or one module may be executed by using plural computers in a distributed or parallel environment. One module may integrate another module therein. Hereinafter, the term "connection" includes, not only physical connection, but also logical connection (sending and receiving of data, giving instructions, reference relationship among data elements, etc.). The term "predetermined" means being determined prior to a certain operation, and includes the meaning of being determined prior to a certain operation before starting processing of the exemplary embodiments, and also includes the meaning of being determined prior to a certain operation even after starting processing of the exemplary embodiments, in accordance with the current situation/state or in accordance with the previous situation/state.

A system or an apparatus may be realized by connecting plural computers, hardware units, devices, etc., one another via a communication medium, such as a network (including communication based on a one-on-one correspondence), or may be realized by a single computer, hardware unit, device, etc. The terms "apparatus" and "system" are used synonymously. The term "system" does not include merely a man-made social "mechanism" (social system).

Additionally, before performing an operation by using a corresponding module or when performing plural operations by using a corresponding module, target information is read from a storage device, and after performing the operation, a processed result is written into the storage device. Accordingly, a description of reading from the storage device before an operation or writing into the storage device after an operation may be omitted. Examples of the storage device may include a hard disk, a random access memory (RAM), an external storage medium, a storage device using a communication circuit, a register in a central processing unit (CPU), etc.

An image processing apparatus shown in FIG. 1 of the first exemplary embodiment serves the function to eliminate fog from images. The image processing apparatus shown in FIG. 1 includes by way of example an image receiving module 110, an amount-of-fog estimating module 120, a pixel-value measuring module 130, a correction-target-value determining module 140, a chroma correcting module 150, and an output module 160.

The image receiving module 110 is connected to the amount-of-fog estimating module 120. The image receiving module 110 receives an image and delivers the received image to the amount-of-fog estimating module 120. Receiving an image includes reading an image by using, for example, a scanner and a camera, receiving an image from an external device by using, for example, a fax machine, via a communication circuit, reading an image stored in a hard disk (which may be built in a computer or may be connected to the computer via a network), etc. The image is a multi-valued image (including a color image). Only one image may be received or plural images may be received. The contents of images include business documents (e.g., the above-described name cards), advertising pamphlets, images drawn on a whiteboard, etc. The image receiving module 110 may make correction for the received image by performing digital filer processing, etc., such correction including camera shake correction. An example of processing performed by the image receiving module 110 will be discussed later with reference to FIG. 3.

The amount-of-fog estimating module 120 is connected to the image receiving module 110 and the pixel-value measuring module 130. The amount-of-fog estimating module 120 estimates, for each of pixels within an image received by the image receiving module 110, on the basis of the received image, the amount of fog, which is a difference between the original luminance value of a pixel and the luminance value of the corresponding pixel of the received image. The amount-of-fog estimating module 120 then delivers the estimated amount of fog to the correction-target-value determining module 140 and the chroma correcting module 150. The amount-of-fog estimating module 120 estimates, from, for example, the distribution of the background color of a subject document to be photographed, the amount of fog and the gradient of the degree of fog at each set of coordinates. As a specific example of a technique employed in the amount-of-fog estimating module 120, the technique disclosed in Japanese Patent No. 4111697 may be applied. Typical luminance values at predetermined quantized points of an image may be generated, and an estimated luminance value at each set of coordinates may be calculated from the typical luminance values of the quantized points which surround the set of coordinates.

The pixel-value measuring module 130 is connected to the amount-of-fog estimating module 120 and the correction-target-value determining module 140. The pixel-value measuring module 130 measures the chroma value of each of pixels within an image received by the image receiving module 110, and delivers the measured chroma values to the correction-target-value determining module 140. The pixel-value measuring module 130 may measure the chroma values of the pixels by scanning the image. Concerning the scanning direction, a scanning operation comparable to that performed by a pixel-value measuring module 1640 in a fifth exemplary embodiment, which will be described below, may be performed. The pixel-value measuring module 130 may measure, not only the chroma values of pixels, but also the luminance values of pixels. The meaning of pixel values includes chroma values and luminance values.

The correction-target-value determining module 140 is connected to the pixel-value measuring module 130 and the chroma correcting module 150. The correction-target-value determining module 140 determines a correction target value for the luminance values in the background of an image received by the image receiving module 110. The correction-target-value determining module 140 then delivers the determined correction target value to the chroma correcting module 150. The correction-target-value determining module 140 determines, from the amount of fog estimated by the amount-of-fog estimating module 120, a correction target value for the luminance values when it is assumed that the entire surface of the received image is the background of the document. Alternatively, the correction-target-value determining module 140 may set a fixed correction target value in advance, or determine a correction target value by calculating luminance values of pixels that satisfy a predetermined condition from the luminance distribution of fog. More specifically, the luminance values of the pixels within a received image are collected so as to generate a luminance histogram. Then, in the luminance histogram, the luminance value of pixels that satisfy a predetermined condition (e.g., pixels having the luminance value lower than the brightest luminance by 10%) may be set as the correction target value. Alternatively, an operator may set a luminance value as the correction target value.

The chroma correcting module 150 is connected to the correction-target-value determining module 140 and the output module 160. The chroma correcting module 150 corrects a chroma value of each of the pixels measured by the pixel-value measuring module 130 on the basis of the amount of fog estimated by the amount-of-fog estimating module 120 (hereinafter also referred to as the "estimated luminance value"), the correction target value determined by the correction-target-value determining module 140, and the distance from the chroma value to an achromatic color. The chroma correcting module 150 then delivers an image for which the chroma values have been corrected to the output module 160. The image for which the chroma values have been corrected is an image from which fog has been eliminated.

The chroma correcting module 150 may correct the chroma values such that, as the chroma value measured by the pixel-value measuring module 130 is closer to an achromatic color, the amount of correction for the chroma value decreases. For example, in accordance with the distance from the axis of the achromatic color in a color space to a certain chroma value, a correction suppression factor (parameter for decreasing the correction of a chroma value) may be calculated, and in this case, when the chroma value is positioned on the axis of the achromatic color, the correction suppression factor takes the minimum value.

The chroma correcting module 150 may correct the chroma value of each of the pixels on the basis of the difference between the correction target value and the amount of fog. More specifically, the chroma correcting module 150 may increase the amount of correction for the chroma value in accordance with the difference between the correction target value and the amount of fog. More specifically, the chroma correcting module 150 may increase the amount of correction by using a monotonically increasing polynomial function, such as a linear function or a multidimensional function, in accordance with the difference.

The processing performed by the chroma correcting module 150 will be discussed later by using equations (1), (2), and (3).

The output module 160 is connected to the chroma correcting module 150. The output module 160 receives an image for which the chroma has been corrected by the chroma correcting module 150, and outputs the image. Outputting an image includes printing an image by using, for example, a printer, displaying an image on, for example, a display, transmitting an image by using an image transmitting apparatus, such as a fax machine, writing an image into an image storage device, such as an image database, storing an image in a storage medium, such as a memory card, delivering an image to another information processing apparatus, etc. Such an image may be output in association with the image received by the image receiving module 110.

Figure 2:
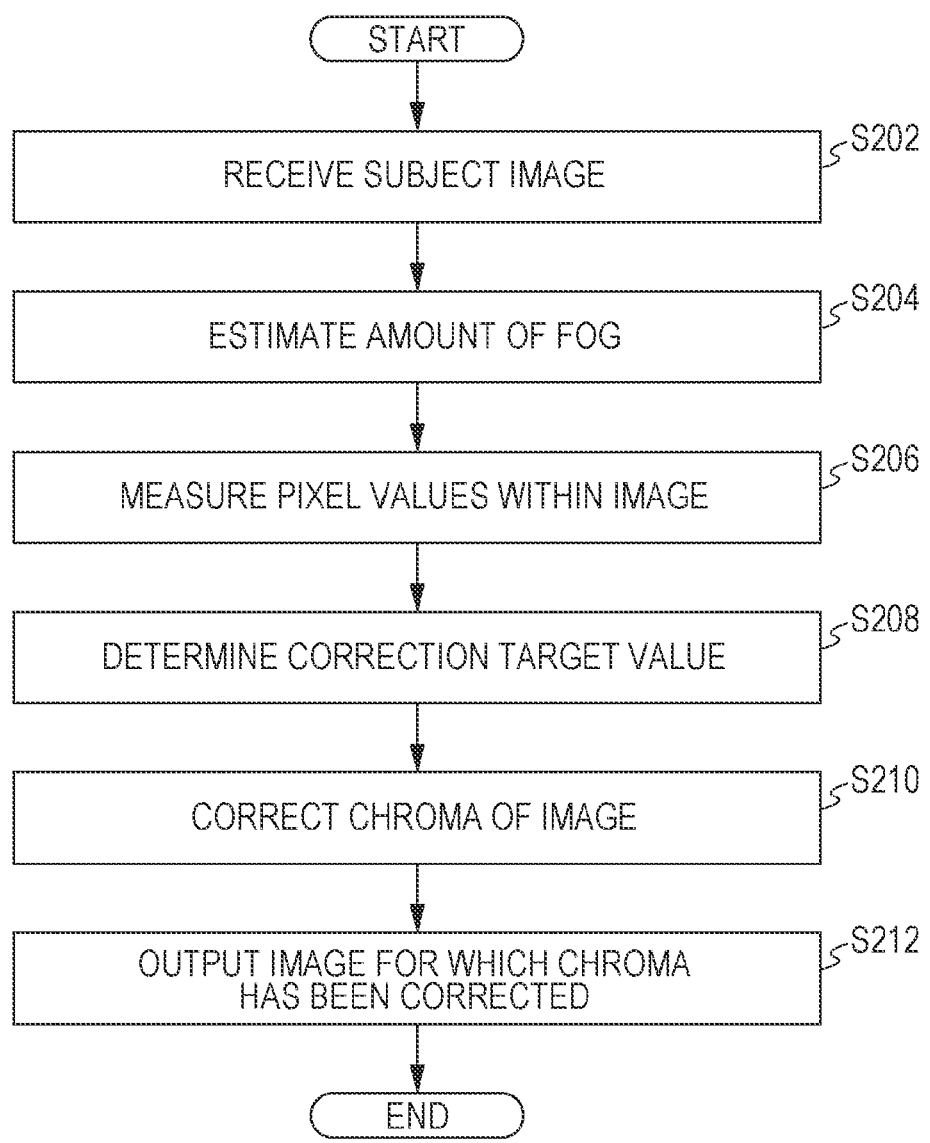
FIG. 2 is a flowchart illustrating an example of processing according to the first exemplary embodiment.

FIG. 2 is a flowchart illustrating an example of processing according to the first exemplary embodiment.

In step S202, the image receiving module 110 receives a subject image.

FIG. 3 illustrates an example of the processing performed by the image receiving module 110. A subject document 320 to be photographed is equivalent to the subject document 3100 shown in FIG. 31A. When the subject document 320 is photographed by using an image capturing device 310, fog occurs and is reflected in a resulting image, such as that in a photographed image 330. For example, after exchanging name cards, the subject document 320 representing one of the name cards is placed on a desk and is photographed with the image capturing device 310. The image capturing device 310 may be an independent digital camera, a digital camera built in a personal digital assistant e.g., in a cellular phone including a smartphone, or a scanner, etc.

In step S204, the amount-of-fog estimating module 120 estimates the amount of fog.

In step S206, the pixel-value measuring module 130 measures pixel values within an image.

In step S208, the correction-target-value determining module 140 determines a correction target value.

Figure 4:
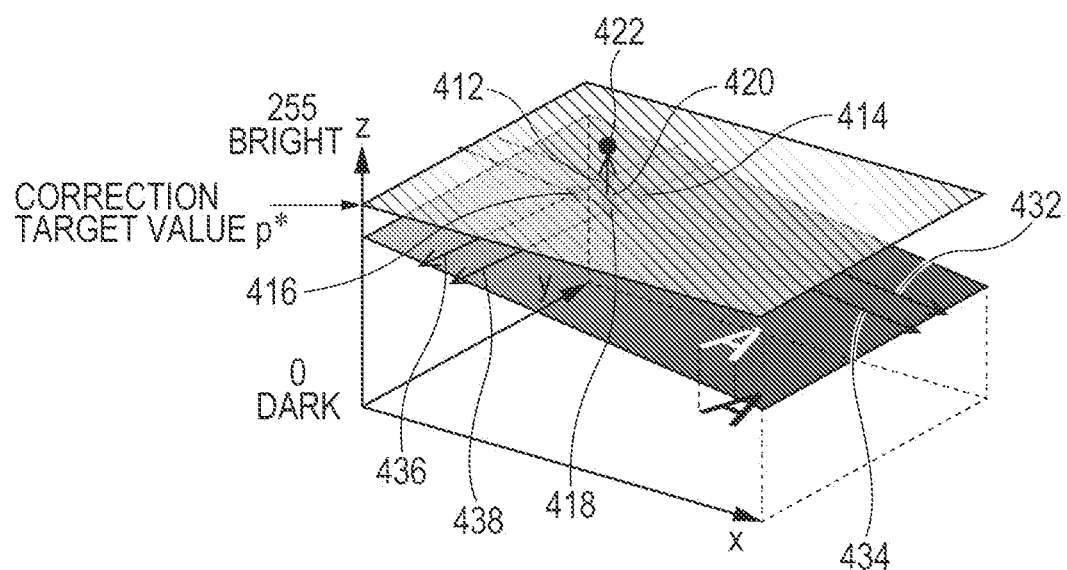
FIG. 4 illustrates an example of processing performed by an amount-of-fog estimating module, a pixel-value measuring module, and a correction-target-value determining module.

FIG. 4 illustrates an example of a process of eliminating fog from an image, which is represented three-dimensionally, such process being executed by the amount-of-fog estimating module 120, the pixel-value measuring module 130, and the correction-target-value determining module 140. In FIG. 4, the x axis and the y axis designate a position in the image, and the z axis is a space representing the luminance value. Along the z axis, the gray plane positioned at the lower side is a fog image, which covers the entire image. The gray plane is decreased in the x-axis direction because the fog image becomes darker toward the right side. The pale hatched plane positioned at the upper side designates the corrected luminance value of the image. As shown in FIG. 4, p* is the correction target value determined in step S208, and is, for example, the luminance value which is lower than the brightest luminance value by 10%, as described above. If, in step S210, the luminance is to be corrected, the luminance values at the individual points are increased (luminance is brighter) to p* on the z axis, thereby eliminating fog. FIG. 4 shows that the luminance at a point of intersection 420 surrounded by points of intersection 412, 414, 416, and 418 is increased to an intermediate point 422. The points of intersection 412 and 414 are positioned on a line 432, while the points of intersection 416 and 418 are positioned on a line 434. The points of intersection 412 and 416 are positioned on a line 436, while the points of intersection 414 and 418 are positioned on a line 438. Concerning a character portion (shown as "A" in FIG. 4), which is other than the background of the image, a luminance value lower than that of the background is measured by the pixel-value measuring module 130.

In step S210, the chroma correcting module 150 corrects the chroma of the image. The chroma correcting module 150 increases the chroma value in accordance with the amount of fog estimated by the amount-of-fog estimating module 120. In the L*ab color space, chroma components (a, b) are intensified in equations (1) and (2), and (3).

$$\text{new}\_a = a + (a-128) \cdot C \cdot \text{color}R \quad (1)$$

$$\text{new}\_b = b + (b-128) \cdot C \cdot \text{color}R \quad (2)$$

$$\text{color}R = 1 - \max(0, 1-(1-a/128)^2-(1-b/128))^2) \quad (3)$$

In equations (1) and (2), C is the amount of fog, and C is also the amount of correction for the luminance in equation (8), which will be discussed in a third exemplary embodiment. In equations (1), (2), and (3), for chromatic color portions, the chroma is increased by an amount corresponding to the amount by which the luminance is corrected, and for achromatic color portions, the chroma is not corrected. If the chroma components (a, b) are 128, such a color portion is considered to be an achromatic color.

In equation (3), in order to maintain the legibility of a document, the enhancement of the chroma of an achromatic color (e.g., a white background or black characters) is suppressed. That is, as the chroma is closer an achromatic color, colorR in equation (3) approximates 0.

The chroma correcting module 150 corrects the chroma value such that, as the difference between the correction target value and the amount of fog increases, the amount of correction for the chroma value increases. This means that C in equation (8) (see the second section of equation (8)), which will be discussed later, increases. More specifically, C is increased by using a monotonically increasing polynomial function, such as a linear function or a multidimensional function (see the third section in equation (8)), in accordance with the difference.

In step S210, the chroma correcting module 150 may also correct luminance values. Correction for luminance values may be performed by using a correcting method in the third exemplary embodiment.

Figure 5B:
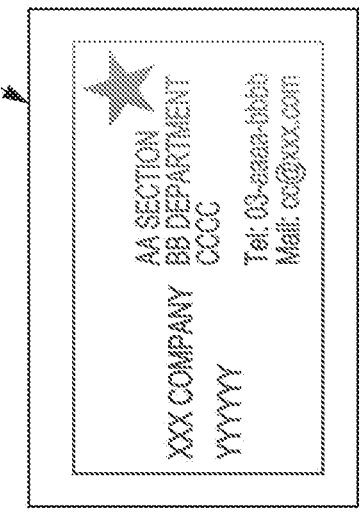
FIGS. 5A, 5B, and 5C illustrate an example of processing performed by a chroma correcting module.
Figure 5C:
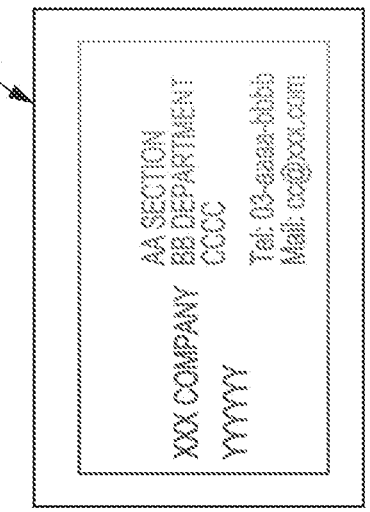
Figure 5A:
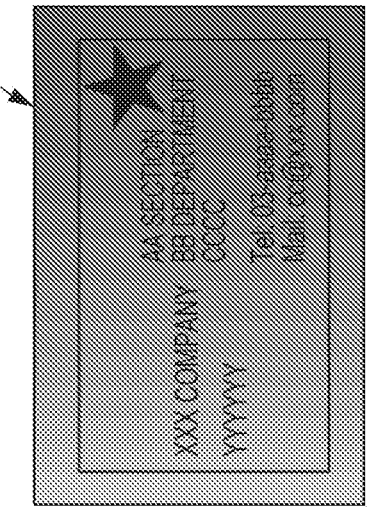

FIGS. 5A, 5B, and 5C illustrate an example of processing (experiment) performed by the chroma correcting module 150. In this example, if the luminance and chroma of the photographed image 330 received by the image receiving module 110 in step S202 have been corrected in step S210, a processed image 540 is generated. If only the luminance of the photographed image 330 is corrected, a fog-eliminated image 550 is generated. It is obvious that the chromatic portion of the processed image 540 of this exemplary embodiment has been reproduced more sharply than that of the fog-eliminated image 550.

In step S212, the output module 160 outputs an image for which the chroma has been corrected. For example, a printer prints an image from which fog has been eliminated.

Second Exemplary Embodiment

Figure 6:
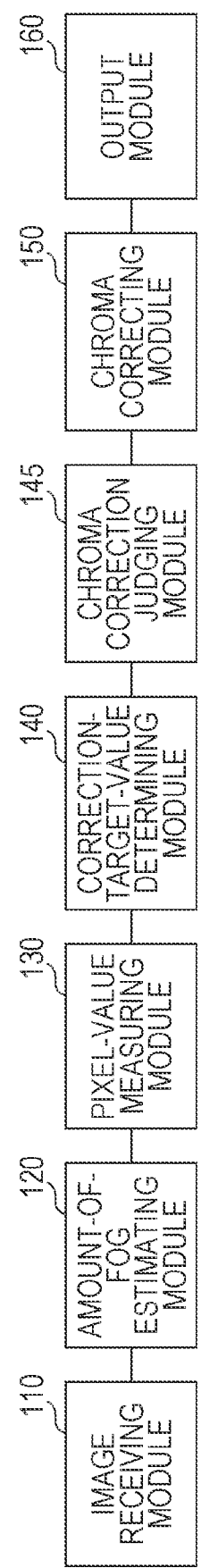
FIG. 6 is a block diagram illustrating conceptual modules forming an image processing apparatus according to a second exemplary embodiment.

FIG. 6 is a block diagram illustrating conceptual modules forming an image processing apparatus according to a second exemplary embodiment.

The image processing apparatus shown in FIG. 6 of the second exemplary embodiment serves the function to eliminate fog from images. The image processing apparatus shown in FIG. 6 includes by way of example an image receiving module 110, an amount-of-fog estimating module 120, a pixel-value measuring module 130, a correction-target-value determining module 140, a chroma correction judging module 145, a chroma correcting module 150, and an output module 160. The same or similar elements as or to those in the first exemplary embodiment are designated by like reference numerals, and an explanation thereof will be omitted. However, elements designated by the same reference numerals as those of the first exemplary embodiment will be described if the functions and operations thereof are different from those of the first exemplary embodiment. Even for those elements, the same portions as those of the first exemplary embodiment will not be described. The same applies to a description of the following exemplary embodiments.

The correction-target-value determining module 140 is connected to the pixel-value measuring module 130 and the chroma correction judging module 145. The correction-target-value determining module 140 of the second exemplary embodiment is comparable to the counterpart of the first exemplary embodiment, except that it delivers a determined correction target value to the chroma correction judging module 145.

The chroma correction judging module 145 is connected to the correction-target-value determining module 140 and the chroma correcting module 150. When the gradient of the estimated luminance value is large and when the difference between the estimated luminance value and the target luminance value is also large, portions other than a background, such as characters, may sometimes become too dense to be illegible. Taking this situation into consideration, the chroma correction judging module 145 does not always perform correction processing.

The chroma correction judging module 145 judges whether to perform correction by using the chroma correcting module 150, on the basis of the difference between the amount of fog estimated by the amount-of-fog estimating module 120 and the correction target value determined by the correction-target-value determining module 140. This determination processing will be discussed later by using equation (4).

The chroma correction judging module 145 may judge whether to perform correction by using the chroma correcting module 150 on the basis of the difference between the amounts of fog, estimated by the amount-of-fog estimating module 120, of the pixels within the image received by the image receiving module 110. This determination processing will be discussed later by using equations (5) and (6).

The chroma correcting module 150 is connected to the chroma correction judging module 145 and the output module 160. The chroma correcting module 150 of the second exemplary embodiment is comparable to the counterpart of the first exemplary embodiment. However, it performs correction only when the chroma correction judging module 145 judges that correction will be performed.

Figure 7:
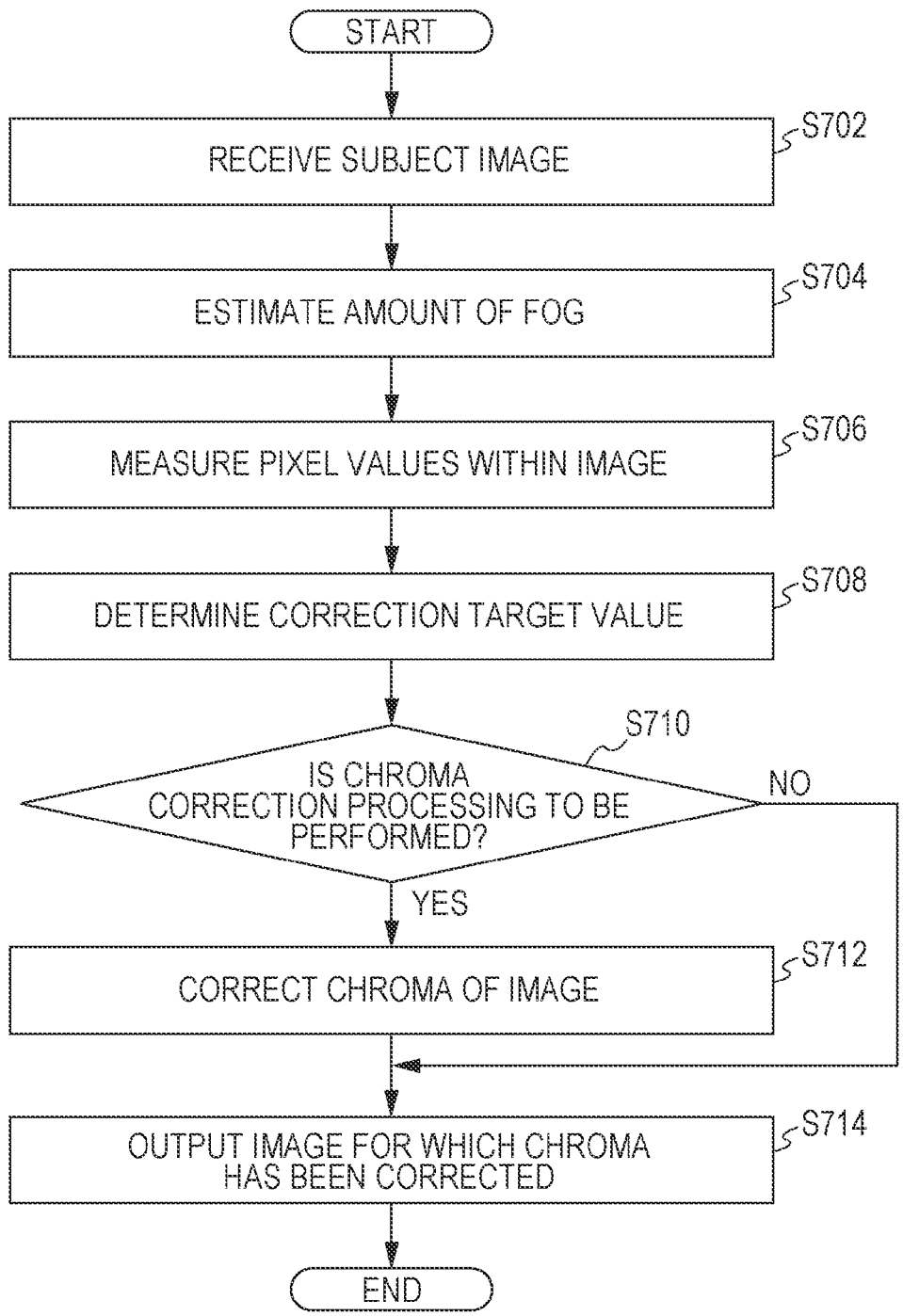
FIG. 7 is a flowchart illustrating an example of processing according to the second exemplary embodiment.

FIG. 7 is a flowchart illustrating an example of processing performed by the image processing apparatus according to the second exemplary embodiment. Steps S702 through S708, S712, and S714 are similar to steps S202 through S208, S210, and S212, respectively, shown in FIG. 2.

In step S702, the image receiving module 110 receives a subject image.

In step S704, the amount-of-fog estimating module 120 estimates an amount of fog.

In step S706, the pixel-value measuring module 130 measures pixel values within the image.

In step S708, the correction-target-value determining module 140 determines a correction target value.

In step S710, the chroma correction judging module 145 judges whether to perform chroma correction processing. If the result of step S710 is YES, the process proceeds to step S712, and if the result of step S710 is NO, the process proceeds to step S714.

For example, if the calculated value E in one of equations (4), (5), and (6) exceeds a predetermined value, luminance correction processing is not performed.

$$E = \max_{i,j}(|p^*_{ij} - e_{ij}|) \quad (4)$$

In equation (4), $e_{ij}$ is an estimated luminance value at coordinates $(x_i, y_j)$, and $p^*_{ij}$ is a correction target value at coordinates $(x_i, y_j)$.

Figure 8:
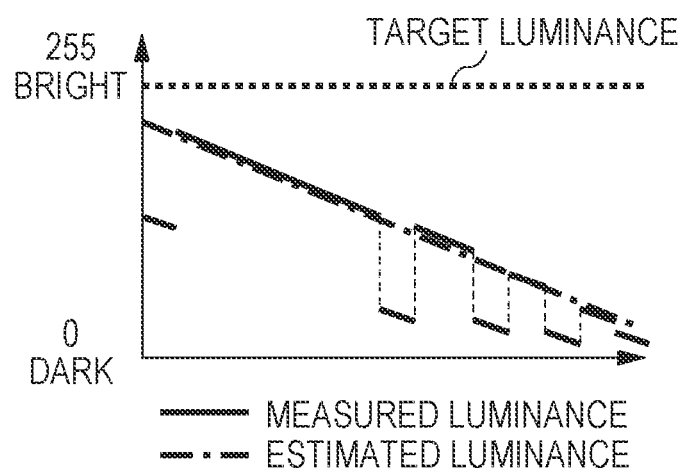
FIG. 8 illustrates an example of processing performed by a chroma correction judging module.

In equation (4), the difference between the estimated luminance value and the correction target value is utilized. In the example shown in FIG. 8, the maximum value of the distance between the target luminance indicated by the dotted line and the estimated luminance indicated by the one-dot chain line designates the calculated value E.

$$E'_1 = \max_{i,j,m,n}(|e_{ij} - e_{mn}|) \quad (5)$$

In equation (5), the difference between estimated luminance values of the pixels is utilized. In the example shown in FIG. 8, the distance between the maximum value and the minimum value of the estimated luminance indicated by the one-dot chain line designates the calculated value $E'_1$.

$$E'_2 = \max_{i,j,m,n}\left(|e_{ij} - e_{mn}|/\sqrt{(x_i - x_m)^2 + (y_j - y_n)^2}\right) \quad (6)$$

In equation (6), the difference between estimated luminance values of the pixels is normalized by the distance and is utilized as the gradient. In the example shown in FIG. 8, the gradient of the estimated luminance indicated by the one-dot chain line designates the calculated value $E'_2$.

In step S712, the chroma correcting module 150 corrects the chroma of the image.

In step S714, the output module 160 outputs the image for which the chroma has been corrected.

In comparison with the first and second exemplary embodiments, a comparative example will be described below with reference to FIGS. 31C through 31G.

In the comparative example, even if the amount of fog is correctly calculated, the chroma of the mark positioned at the top right of the document is removed.

This will be described below by way of an example shown in FIGS. 31C through 31G. Within the photographed image 3130 shown in FIG. 31C, a line 3132 is scanned, and the luminance values obtained as a result of scanning are represented by a graph shown in FIG. 31D. In this graph, the vertical axis designates the luminance value, and the horizontal axis designates the x coordinates in the scanning operation. That is, since the fog image 3120 is darker toward the right side, the luminance value decreases toward the right side accordingly. However, the luminance values of the original image are also reflected in the pixel values shown in FIG. 31D, and thus, the luminance values are progressively changed, as indicated by luminance distributions 3142 through 3158. Also, the chroma values obtained as a result of scanning the line 3132 are represented by a graph shown in FIG. 31E. That is, the attenuation factor of the chroma decreases toward the right side.

Figure 31F:
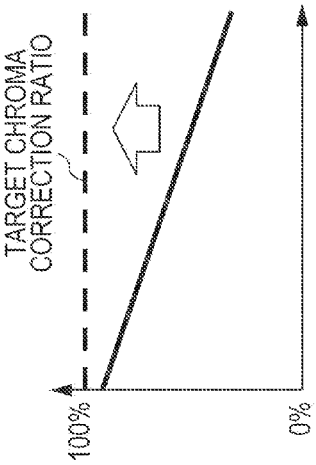
Figure 31B:
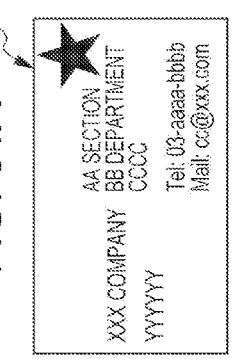
Figure 31D:
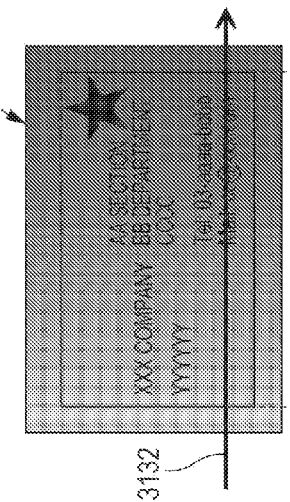
Figure 31E:
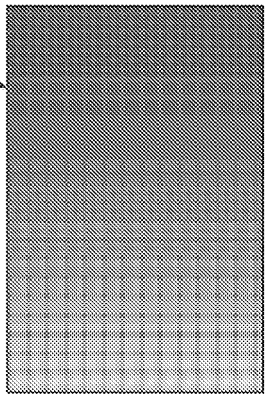

Then, if only the luminance is corrected on the basis of the amount of fog, the resulting image is seen as a corrected image 3160 shown in FIG. 31F. In the right side of the corrected image 3160, the black characters have turned out to be a pale gray. Additionally, the chroma of the red mark at the top right is removed.

Figure 31G:
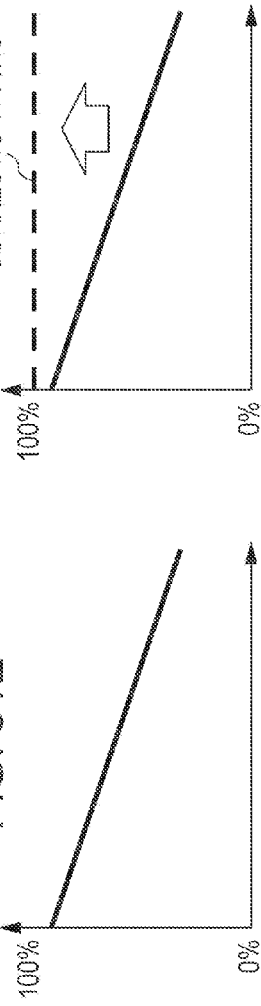

In order to reproduce the original document, as in the subject document 3100, it is necessary to increase the chroma values in proportion to the amount of correction for the luminance values, as in the example shown in FIG. 31G. In the first and second exemplary embodiments, as well as the luminance values, the chroma values are corrected, thereby maintaining a high level of reproducibility of chromatic color portions.

Third Exemplary Embodiment

A description will now be given of a third exemplary embodiment.

In order to facilitate the understanding of third and fourth exemplary embodiments, a technology, which serves as a basis for the third and fourth exemplary embodiments, will first be described.

Figure 32A:
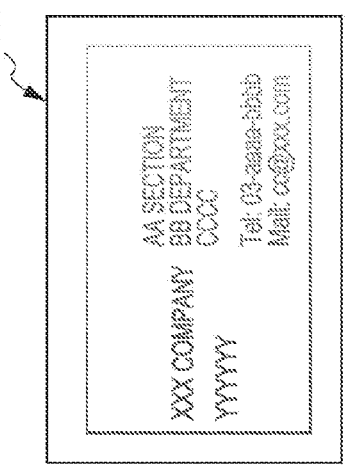

In FIG. 32A, a subject document 3200 to be photographed is a name card and is printed only in black and white.

Figure 32C:
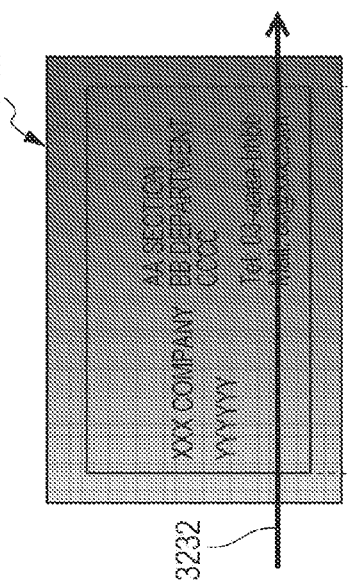
Figure 32B:
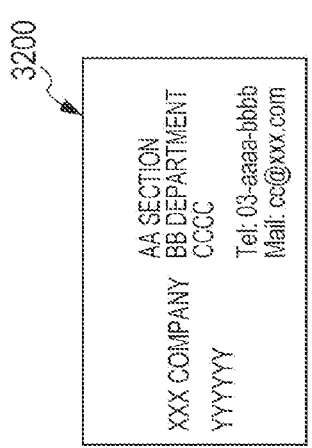
Figure 32E:
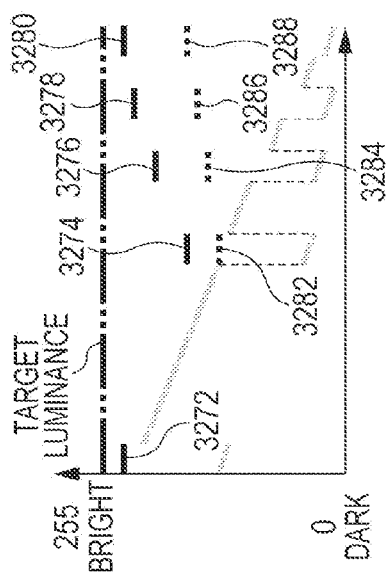
Figure 32D:
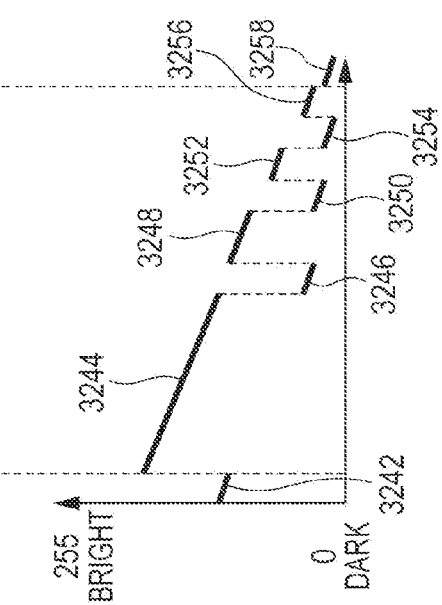

The subject document 3200 is photographed by using, for example, a digital camera, resulting in a photographed image 3230 shown in FIG. 32C. In this case, the photographed image 3230 shows that image deterioration, such as a fog image 3220 shown in FIG. 32B, has occurred and is superposed on the photographed image 3230. FIG. 32B shows that the fog image 3220 is a gradation image in which the right side is a dark black and the left side is a light black, i.e., the shade of the color progressively changes. Accordingly, in the photographed image 3230 shown in FIG. 32C, although the right side is a dark black, the left side is close to the image of the original subject document 3200.

As described above, fog images may be generated, not only by the use of a digital camera, but also by the use of a scanner.

Figure 9:
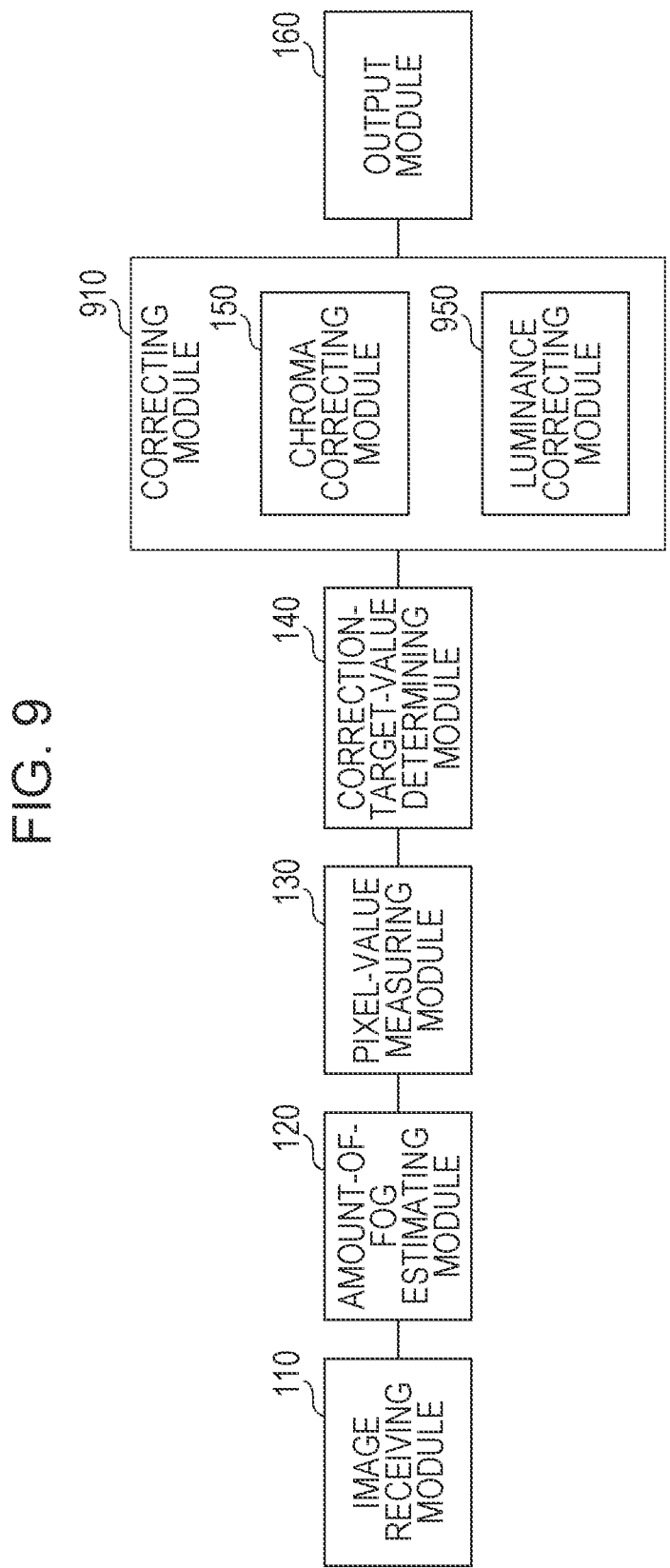
FIG. 9 is a block diagram illustrating conceptual modules forming an image processing apparatus according to a third exemplary embodiment.

FIG. 9 is a block diagram illustrating conceptual modules forming an image processing apparatus according to the third exemplary embodiment. The image processing apparatus shown in FIG. 9 of the third exemplary embodiment serves the function to eliminate fog from images. The image processing apparatus shown in FIG. 9 includes by way of example an image receiving module 110, an amount-of-fog estimating module 120, a pixel-value measuring module 130, a correction-target-value determining module 140, a correcting module 910, and an output module 160. The correcting module 910 includes a chroma correcting module 150 and a luminance correcting module 950.

The pixel-value measuring module 130 is connected to the amount-of-fog estimating module 120 and the correction-target-value determining module 140. The pixel-value measuring module 130 measures pixel values of pixels within an image received by the image receiving module 110, and delivers the measured pixel values to the correction-target-value determining module 140. The pixel-value measuring module 130 measures the pixel values of the pixels by scanning the image.

The correction-target-value determining module 140 is connected to the pixel-value measuring module 130 and the correcting module 910. The correction-target-value determining module 140 determines a correction target value for the luminance values in the background of an image received by the image receiving module 110. The correction-target-value determining module 140 then delivers the determined correction target value to the correcting module 910.

The luminance correcting module 950 is disposed within the correcting module 910 which is connected to the correction-target-value determining module 140 and the output module 160. The luminance correcting module 950 corrects the luminance value of each of the pixels measured by the pixel-value measuring module 130 on the basis of the amount of fog estimated by the amount-of-fog estimating module 120 and the correction target value determined by the correction-target-value determining module 140. The luminance correcting module 950 then delivers an image for which the luminance values have been corrected to the chroma correcting module 150 or the output module 160. The image for which the luminance values have been corrected is an image from which fog has been eliminated.

The luminance correcting module 950 may set the difference between the amount of fog estimated by the amount-of-fog estimating module 120 and the correction target value determined by the correction-target-value determining module 140 to be a basic amount of correction. Then, the luminance correcting module 950 may change the basic amount of correction in accordance with a coefficient which is based on the difference between the luminance value measured by the pixel-value measuring module 130 and the amount of fog. Then, the luminance correcting module 950 may correct the measured luminance value in accordance with the changed basic amount of correction. This processing will be discussed later by using equations (7) and (8).

The above-described coefficient may be set as follows. As the difference between the luminance value measured by the pixel-value measuring module 130 and the amount of fog increases, the basic amount of correction decreases. To decrease the basic amount of correction is to increase the amount of change for the basic amount of correction, and also means that the amount of correction for the measured luminance values is smaller than that for a background portion. For example, a smaller amount of fog is eliminated from an image region than that for, for example, black characters. This processing will be discussed later by using equation (8).

If the difference between the luminance value measured by the pixel-value measuring module 130 and the amount of fog is equal to or greater than a predetermined threshold, or if the difference is greater than the predetermined threshold, the luminance correcting module 950 may not correct the luminance value. This processing will be discussed later by using equation (8).

The luminance correcting module 950 may also change the basic amount of correction by using a coefficient which is based on the basic amount of correction and the difference between the luminance value measured by the pixel-value measuring module 130 and the amount of fog. This processing will be discussed later by using equation (9).

The chroma correcting module 150 is disposed within the correcting module 910 which is connected to the correction-target-value determining module 140 and the output module 160.

The order of processing performed by the chroma correcting module 150 and that performed by the luminance correcting module 950 is not restricted. If the chroma correcting module 150 performs processing first, a resulting image is processed by the luminance correcting module 950. If the luminance correcting module 950 performs processing first, a resulting image is processed by the chroma correcting module 150. Alternatively, the chroma correcting module 150 and the luminance correcting module 950 may perform processing concurrently.

The output module 160 is connected to the correcting module 910. The output module 160 receives an image corrected by the chroma correcting module 150 and the luminance correcting module 950 and outputs the corrected image.

Figure 10:
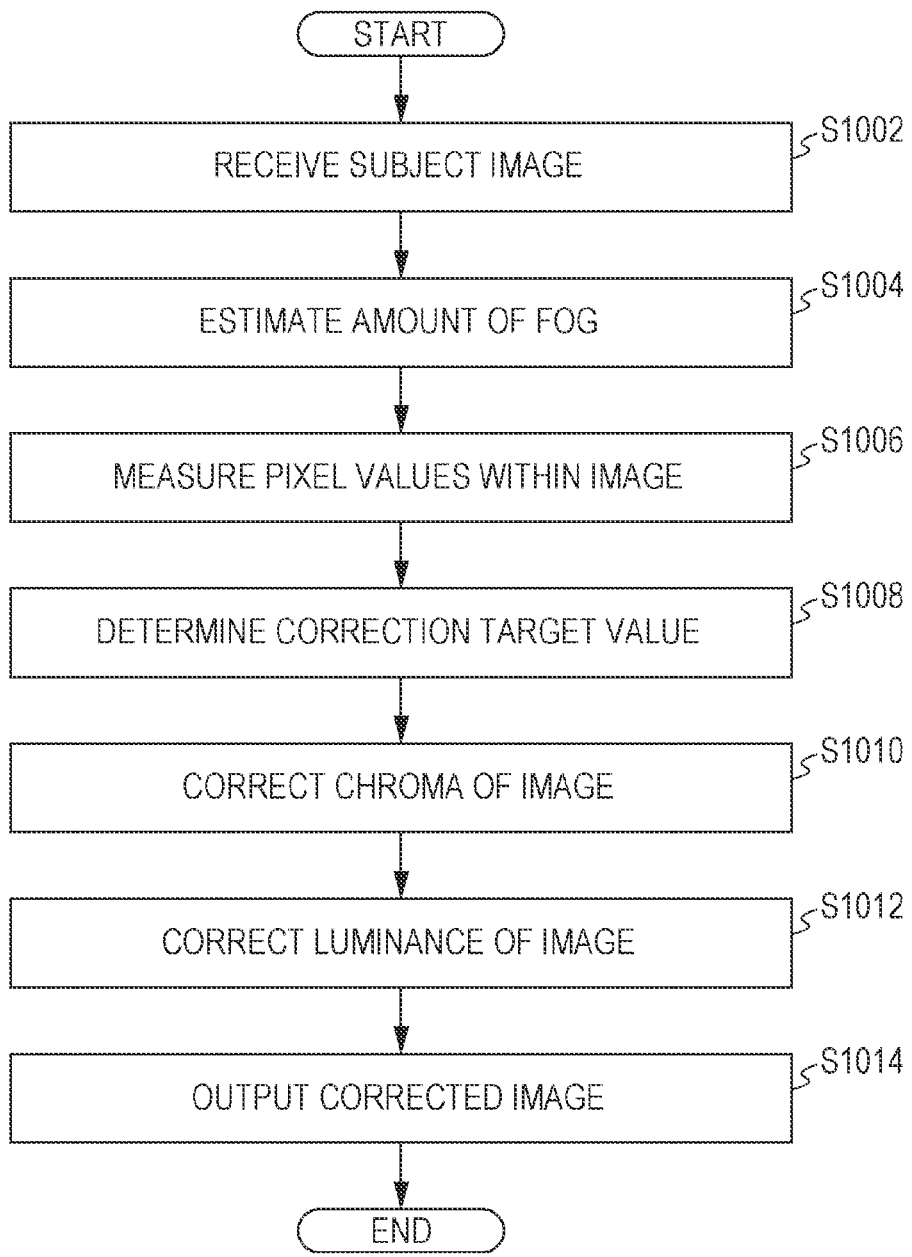
FIG. 10 is a flowchart illustrating an example of processing according to the third exemplary embodiment.

FIG. 10 is a flowchart illustrating an example of processing according to the third exemplary embodiment.

In step S1002, the image receiving module 110 receives a subject image.

Figure 11:
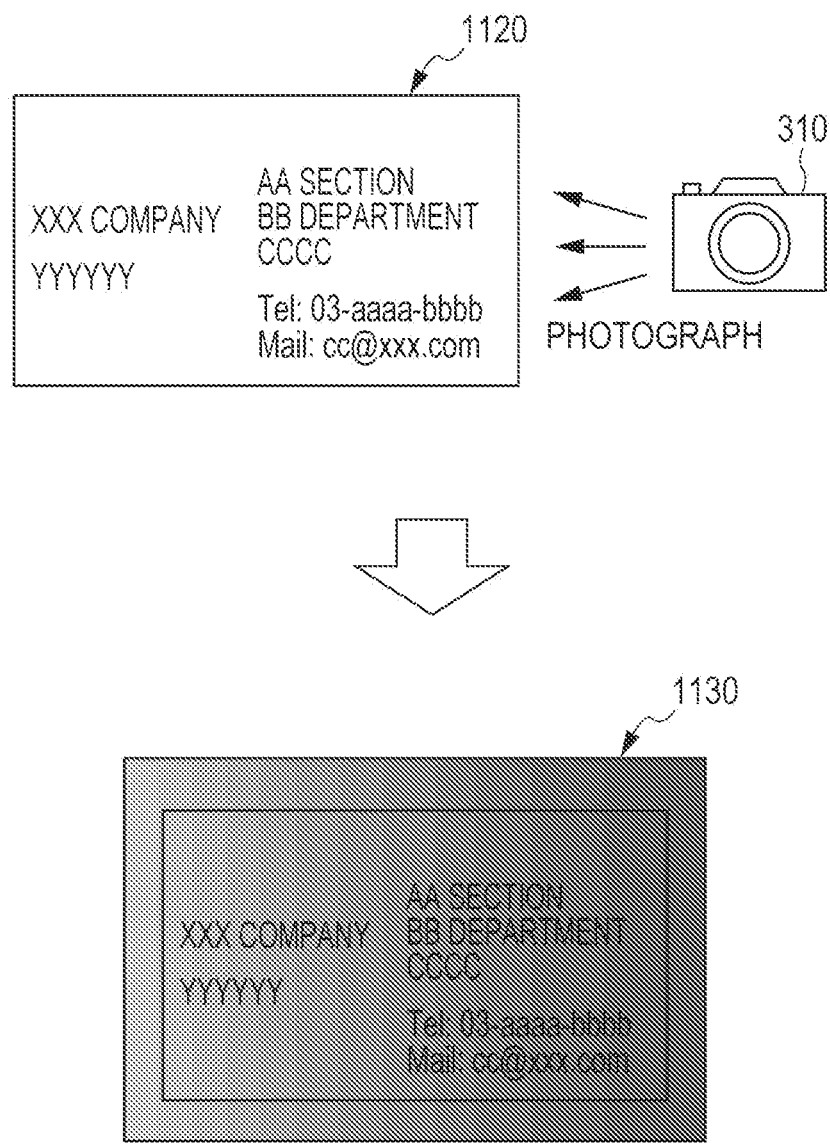
FIG. 11 illustrates an example of processing performed by an image receiving module.

FIG. 11 illustrates an example of the processing performed by the image receiving module 110. A subject document 1120 to be photographed is equivalent to the subject document 3200 shown in FIG. 32A. When the subject image 1120 is photographed by using an image capturing device 310, fog occurs and is reflected in a resulting image, such as that in a photographed image 1130. For example, after exchanging name cards, the subject document 1120 representing one of the name cards is placed on a desk and is photographed with the image capturing device 310. The image capturing device 310 may be an independent digital camera, a digital camera built in a personal digital assistant e.g., in a cellular phone including a smartphone, or a scanner, etc.

In step S1004, the amount-of-fog estimating module 120 estimates the amount of fog.

In step S1006, the pixel-value measuring module 130 measures pixel values within an image.

In step S1008, the correction-target-value determining module 140 determines a correction target value.

Figure 12:
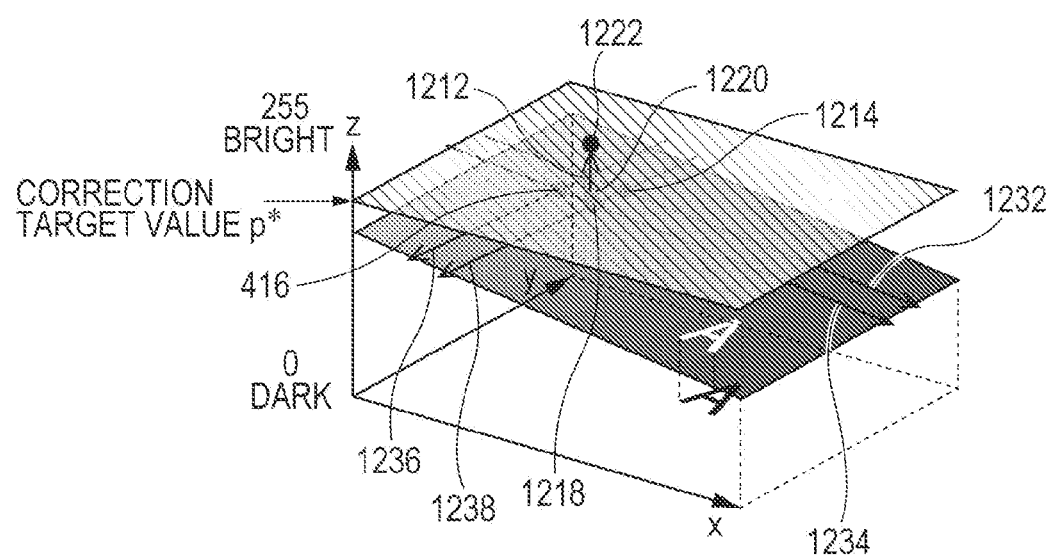
FIG. 12 illustrates an example of processing performed by an amount-of-fog estimating module, a pixel-value measuring module, and a correction-target-value determining module.

FIG. 12 illustrates an example of a process of eliminating fog from an image, which is represented three-dimensionally, such process being executed by the amount-of-fog estimating module 120, the pixel-value measuring module 130, and the correction-target-value determining module 140. In FIG. 12, the x axis and the y axis designate a position in the image, and the z axis is a space representing the luminance value. Along the z axis, the gray plane positioned at the lower side is a fog image, which covers the entire image. The gray plane is decreased in the x-axis direction because the fog image becomes darker toward the right side. The pale hatched plane positioned at the upper side designates the corrected luminance value of the image. As shown in FIG. 12, p* is the correction target value determined in step S1008, and is, for example, the luminance value which is lower than the brightest luminance value by 10%, as described above. In step S1012, the luminance values at the individual points are increased (luminance is brighter) to p* on the z axis, thereby eliminating fog. FIG. 12 shows that the luminance at a point of intersection 1220 surrounded by points of intersection 1212, 1214, 1216, and 1218 is increased to an intermediate point 1222. The points of intersection 1212 and 1214 are positioned on a line 1232, while the points of intersection 1216 and 1218 are positioned on a line 1234. The points of intersection 1212 and 1216 are positioned on a line 1236, while the points of intersection 1214 and 1218 are positioned on a line 1238. Concerning a character portion (shown as "A" in FIG. 12), which is other than the background of the image, a luminance value lower than that of the background is measured by the pixel-value measuring module 130.

In step S1010, the chroma correcting module 150 corrects the chroma of the image.

In step S1012, the luminance correcting module 950 corrects the luminance of the image. The luminance correcting module 950 checks the difference between the estimated luminance value and the measured luminance value. If the difference is positioned on the darker side (if the result obtained by subtracting the measured luminance value from the estimated luminance value is a positive value), the amount of correction is suppressed more than the background. That is, the luminance of, for example, character portions, is not increased more than necessary.

Figure 13A:
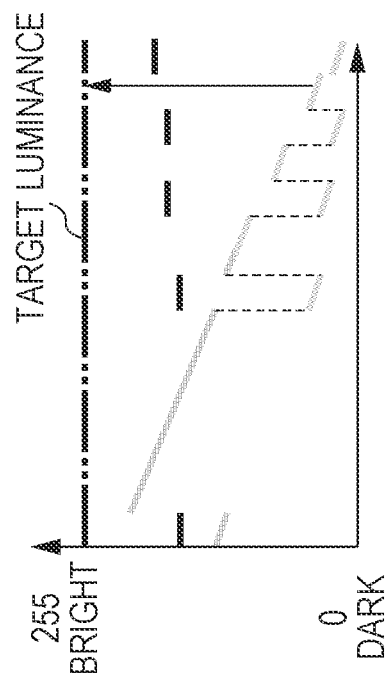
FIGS. 13A and 13B illustrate an example of processing performed by a chroma correcting module.
Figure 13B:
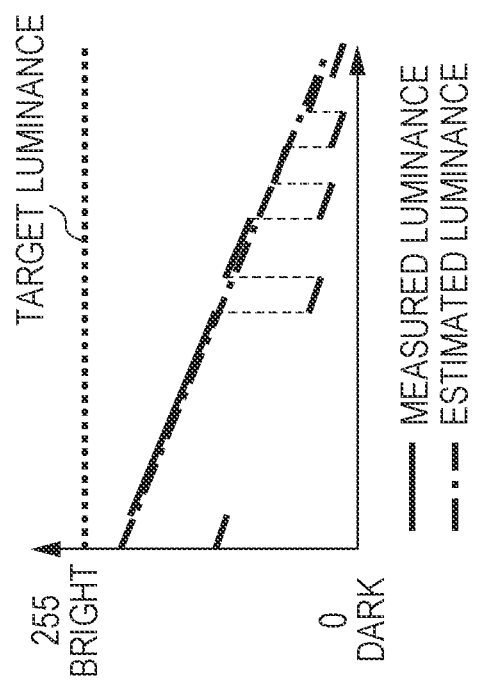

FIGS. 13A and 13B illustrate an example of processing performed by the luminance correcting module 950. FIG. 13A illustrates an example of a graph representing an image which has not yet been corrected by the luminance correcting module 950. FIG. 13B illustrates an example of a graph representing an image which has been corrected by the luminance correcting module 950. In the graphs shown in FIGS. 13A and 13B, the correction target value determined by the correction-target-value determining module 140 is indicated by the dotted line in the horizontal direction. In the graph shown in FIG. 13A, the luminance measured by the pixel-value measuring module 130 is indicated by the solid line, while the amount of fog (estimated luminance value) estimated by the amount-of-fog estimating module 120 is indicated by the one-dot chain line. In the graph shown in FIG. 13B, the luminance measured by the pixel-value measuring module 130 is indicated by the gray solid line, while the luminance value corrected by the luminance correcting module 950 is indicated by the black solid line. That is, the luminance of the background is increased to the correction target value (the luminance is elevated so that the color of the background is paler). In contrast, even though the luminance values of portions other than the background are increased, the amount of correction is smaller than that for the background. Accordingly, the portions other than the background have not become too pale.

A determination regarding whether a certain subject portion within a received image is a background portion or a portion other than a background portion can be made as follows.

If the result obtained by subtracting the measured luminance value from the estimated luminance value of a subject portion is smaller than a threshold, the subject portion is a background portion.

If the result obtained by subtracting the measured luminance value from the estimated luminance value of a subject portion is equal to or greater than the threshold, the subject portion is a portion other than a background portion.

The threshold used for this determination is a predetermined value that allows a subject portion to be recognized as a portion other than a background (e.g., a character) with human eyes.

Then, concerning portions that are found to be background portions, the amount of correction is calculated by subtracting the estimated luminance value from the correction target value. This amount of correction serves as the basic amount of correction. In contrast, concerning portions that are found to be portions other than a background portion, the amount of correction is calculated by multiplying the basic amount of correction by a correction rate R. Then, the calculated amount of correction is added to the measured luminance value. The correction rate R is 1 or smaller, and is calculated according to equation (7):

$$R = \max(0, 1 - \rho^2(\max(0, e-v))^2) \quad (7)$$

where e is an estimated luminance value, v is a measured luminance value, and ρ is a correction intensity parameter. As the difference between the measured luminance value (v) and the estimated luminance value (e) is greater, the correction rate (R), which is a coefficient, approximates to 0. If the right side of equation (7), i.e., the outer term max( ) is 0, and if the difference exceeds a predetermined value, the luminance is not corrected. That is, the correction rate (R) is 0, and the luminance is not corrected (the measured luminance value is maintained as it is). The correction intensity parameter ρ is a predetermined value.

The corrected luminance value new_v is calculated according to equation (8):

$$\begin{aligned} \text{new\_v} &= v + C \\ &= v + R(p^* - e) \\ &= v + (p^* - e)\max(0, 1 - \rho^2(\max(0, e-v))^2) \end{aligned} \quad (8)$$

where p* is a correction target value, and C is the above-described amount of correction.

The luminance correcting module 950 may utilize equation (9) instead of equation (7):

$$R = \max(0, 1 - \rho^2(\max(0, e-v))^{|p^*-e|/\tau}) \quad (9)$$

where τ is a magnification correction value.

By utilizing equation (9), if the difference (p*−e) between the correction target value and the estimated luminance value is large, the amount of correction is suppressed considerably even if the difference between the estimated luminance value and the measured luminance value is small. As the magnification correction value τ, the intermediate luminance value, which is 128, may be used.

In step S1014, the output module 160 outputs a corrected image. For example, a printer prints an image from which fog has been eliminated.

Fourth Exemplary Embodiment

Figure 14:
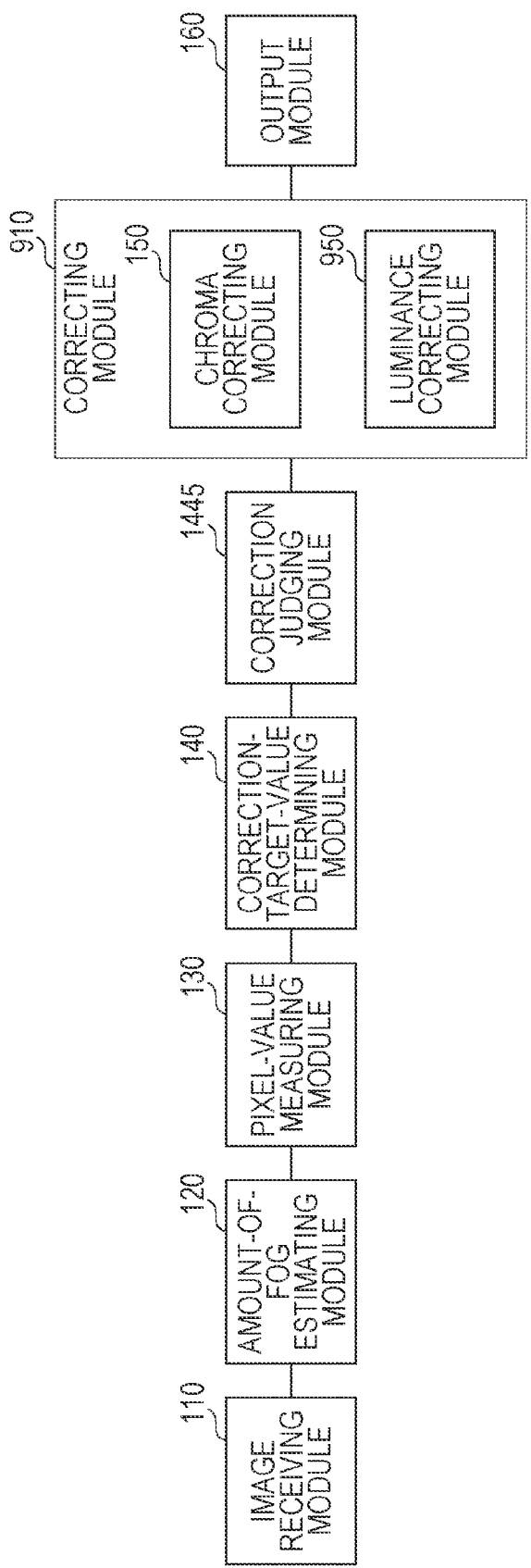
FIG. 14 is a block diagram illustrating conceptual modules forming an image processing apparatus according to a fourth exemplary embodiment.

FIG. 14 is a block diagram illustrating conceptual modules forming an image processing apparatus according to a fourth exemplary embodiment.

The image processing apparatus shown in FIG. 14 of the fourth exemplary embodiment serves the function to eliminate fog from images. The image processing apparatus shown in FIG. 14 includes by way of example an image receiving module 110, an amount-of-fog estimating module 120, a pixel-value measuring module 130, a correction-target-value determining module 140, a correction judging module 1445, a correcting module 910, and an output module 160. The correcting module 910 includes a chroma correcting module 150 and a luminance correcting module 950.

The correction-target-value determining module 140 is connected to the pixel-value measuring module 130 and the correction judging module 1445. The correction-target-value determining module 140 of the fourth exemplary embodiment is comparable to the counterpart of the first exemplary embodiment, except that it delivers a determined correction target value to the correction judging module 1445.

The correction judging module 1445 is connected to the correction-target-value determining module 140 and the correcting module 910. When the gradient of the estimated luminance value is large and when the difference between the estimated luminance value and the target luminance value is also large, portions other than a background, such as characters, may sometimes become too dense to be illegible. Taking this situation into consideration, the correction judging module 1445 does not always perform correction processing.

The correction judging module 1445 judges whether to perform correction by using the chroma correcting module 150 and the luminance correcting module 950, on the basis of the difference between the amount of fog estimated by the amount-of-fog estimating module 120 and the correction target value determined by the correction-target-value determining module 140. This determination processing is equivalent to that performed by the chroma correction judging module 145 by using equation (4) described above.

The correction judging module 1445 may judge whether to perform correction by using the chroma correcting module 150 and the luminance correcting module 950 on the basis of the difference between the amounts of fog, estimated by the amount-of-fog estimating module 120, of the pixels within the image received by the image receiving module 110. This determination processing is equivalent to that performed by the chroma correction judging module 145 by using equations (5) and (6) described above.

The chroma correcting module 150 within the correcting module 910 is comparable to the counterpart of the third exemplary embodiment. However, it performs correction only when the correction judging module 1445 judges that correction will be performed.

The luminance correcting module 950 within the correcting module 910 is comparable to the counterpart of the third exemplary embodiment. However, it performs correction only when the correction judging module 1445 judges that correction will be performed.

Figure 15:
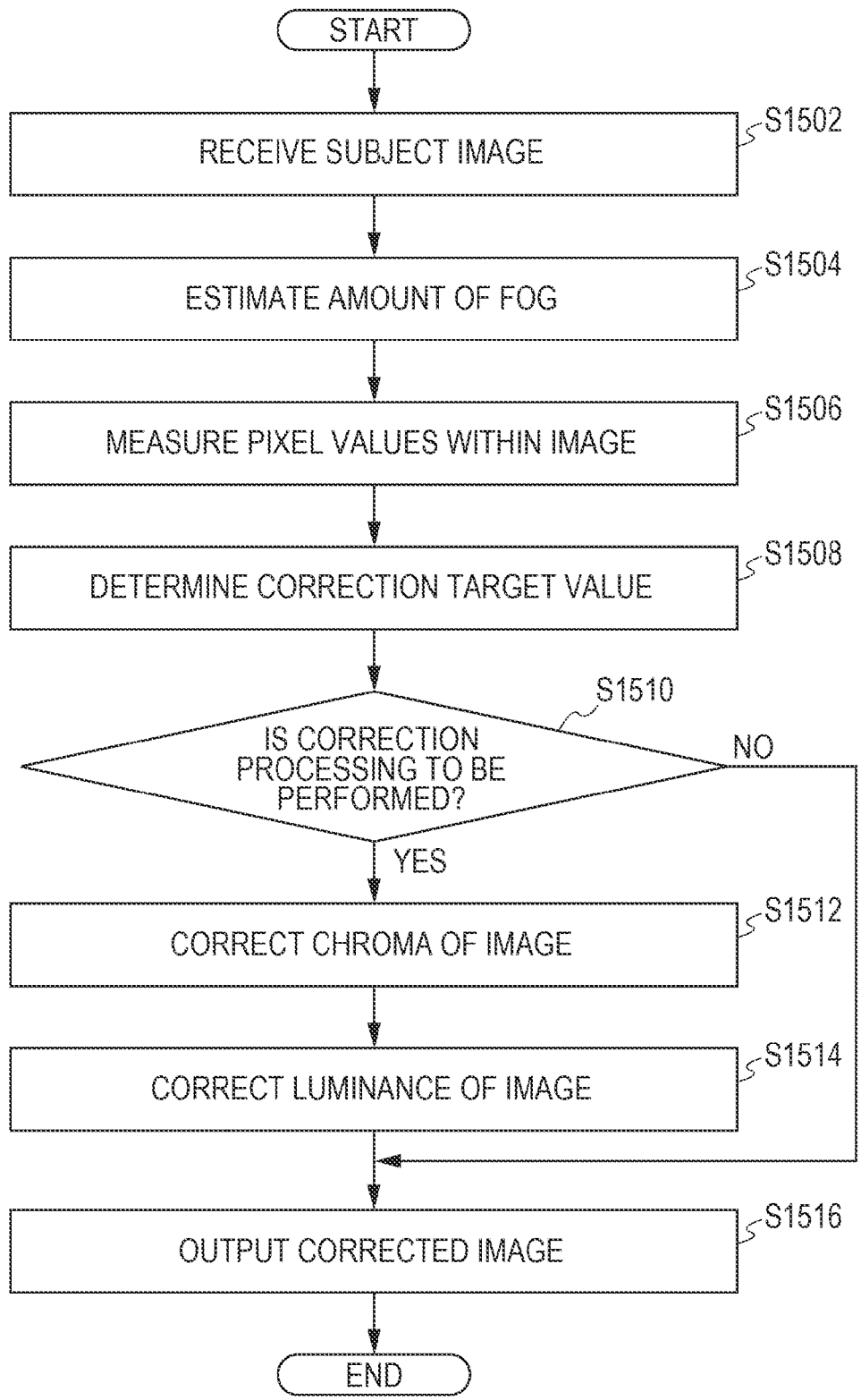
FIG. 15 is a flowchart illustrating an example of processing according to the fourth exemplary embodiment.

FIG. 15 is a flowchart illustrating an example of processing performed by the image processing apparatus according to the fourth exemplary embodiment. Steps S1502 through S1508, S1512 through S1516 are similar to steps S1002 through S1008, S1010 through S1014, respectively, shown in FIG. 10.

In step S1502, the image receiving module 110 receives a subject image.

In step S1504, the amount-of-fog estimating module 120 estimates an amount of fog.

In step S1506, the pixel-value measuring module 130 measures pixel values within the image.

In step S1508, the correction-target-value determining module 140 determines a correction target value.

In step S1510, the correction judging module 1445 judges whether to perform correction processing. If the result of step S1510 is YES, the process proceeds to step S1512, and if the result of step S1510 is NO, the process proceeds to step S1516.

For example, if the calculated value E in one of equations (4), (5), and (6) exceeds a predetermined value, correction processing is not performed, as in step S710 of FIG. 7.

In step S1512, the chroma correcting module 150 corrects the chroma of the image.

In step S1514, the luminance correcting module 950 corrects the luminance of the image.

In step S1516, the output module 160 outputs the corrected image.

In comparison with the third and fourth exemplary embodiments, a comparative example will be described below with reference to FIGS. 32C through 32F.

Even if the amount of fog is correctly calculated, the following problem arises in the comparative example. Since the luminance of a character portion is around 0 (black), the difference between a background portion and the character portion is only small. Then, if the luminance value of the character portion is increased by the same amount as that for the background portion, the character portion becomes too bright.

This will be described below with reference to FIGS. 32C through 32F. Within the photographed image 3230 shown in FIG. 32C, a line 3232 is scanned, and the pixel values obtained as a result of scanning are represented by a graph shown in FIG. 32D. That is, since the fog image 3220 is darker toward the right side, the luminance value decreases toward the right side accordingly. However, the luminance values of the original image are also reflected in the pixel values shown in FIG. 32D, and thus, the luminance values are progressively changed, as indicated by luminance distributions 3242 through 3258. Then, if the luminance values of background portions (luminance distributions 3244, 3248, 3252, and 3256) are corrected toward the target value, portions other than the background portions (luminance distributions 3246, 3250, and 3254) are also corrected as indicated by the solid lines (3274 through 3280) in FIG. 32F. Then, the resulting image is seen as a corrected image 3260 shown in FIG. 32E. In the right side of the corrected image 3260, the black characters have turned out to be a pale gray. This is because correction is equally performed on portions other than background portions, as well as on the background portions.

Figure 32F:
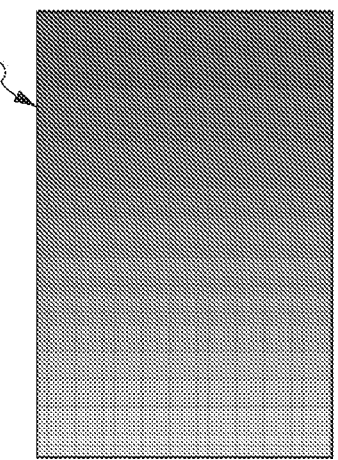

In contrast, in the third and fourth exemplary embodiments, as indicated by the dotted lines representing correction luminance distributions 3282 through 3288, shown in FIG. 32F, a smaller amount of correction is performed on portions other than background portions, thereby maintaining a high level of reproducibility.

Fifth Exemplary Embodiment

A description will now be given of a fifth exemplary embodiment.

In order to facilitate the understanding of fifth and sixth exemplary embodiments, a technology, which serves as a basis for the fifth and sixth exemplary embodiments, will first be described.

Figure 33E:
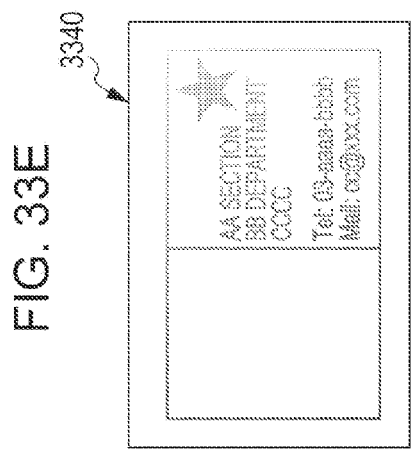
Figure 33C:
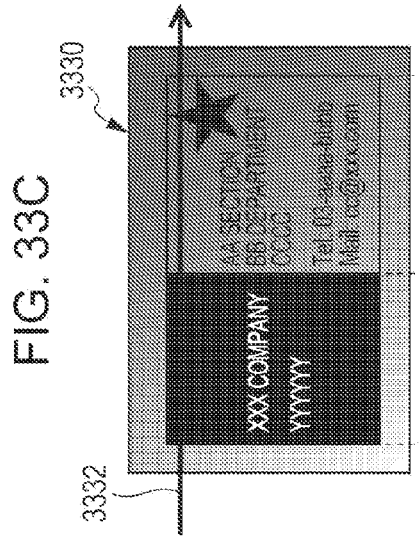
Figure 33A:
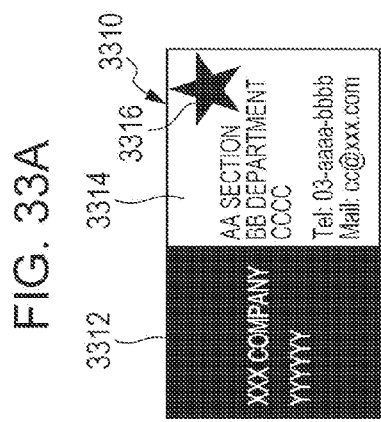
Figure 33F:
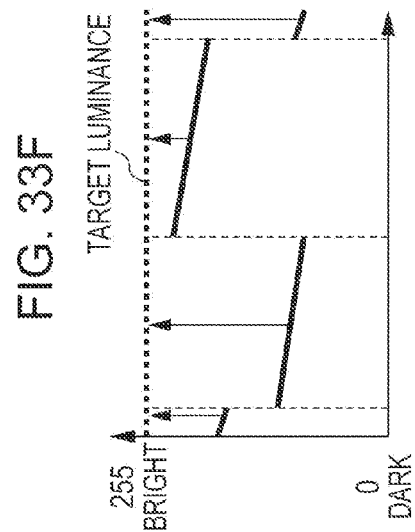
Figure 33D:
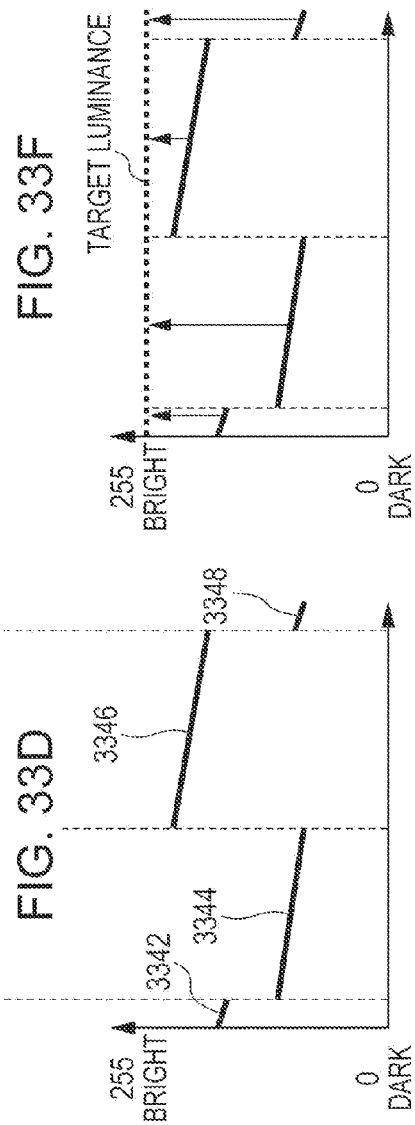
Figure 33B:
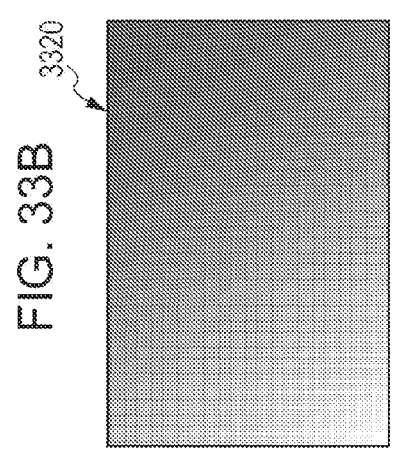

In FIG. 33A, a subject document 3310 to be photographed is a name card and contains, not only a black and white portion, but also a chromatic color portion. More specifically, within the subject document 3310, the background of a region 3312 is red, the background of a region 3314 is white, and a graphic 3316 is a red mark. The subject document 3310 is photographed by using, for example, a digital camera, resulting in a photographed image 3330 shown in FIG. 33C. The photographed image 3330 shows that image deterioration, such as a fog image 3320 shown in FIG. 33B, has occurred and is superposed on the photographed image 3330. The reasons why the fog image 3320 is generated have been described above. FIG. 33B shows that the fog image 3320 is a gradation image in which the top right is a dark black and the bottom left is white, i.e., the shade of the color progressively changes. Accordingly, in the photographed image 3330 shown in FIG. 33C, although the top right is a dark black, the bottom left is close to the image of the original subject document 3310.

As described above, fog images may be generated, not only by the use of a digital camera, but also by the use of a scanner.

Figure 16:
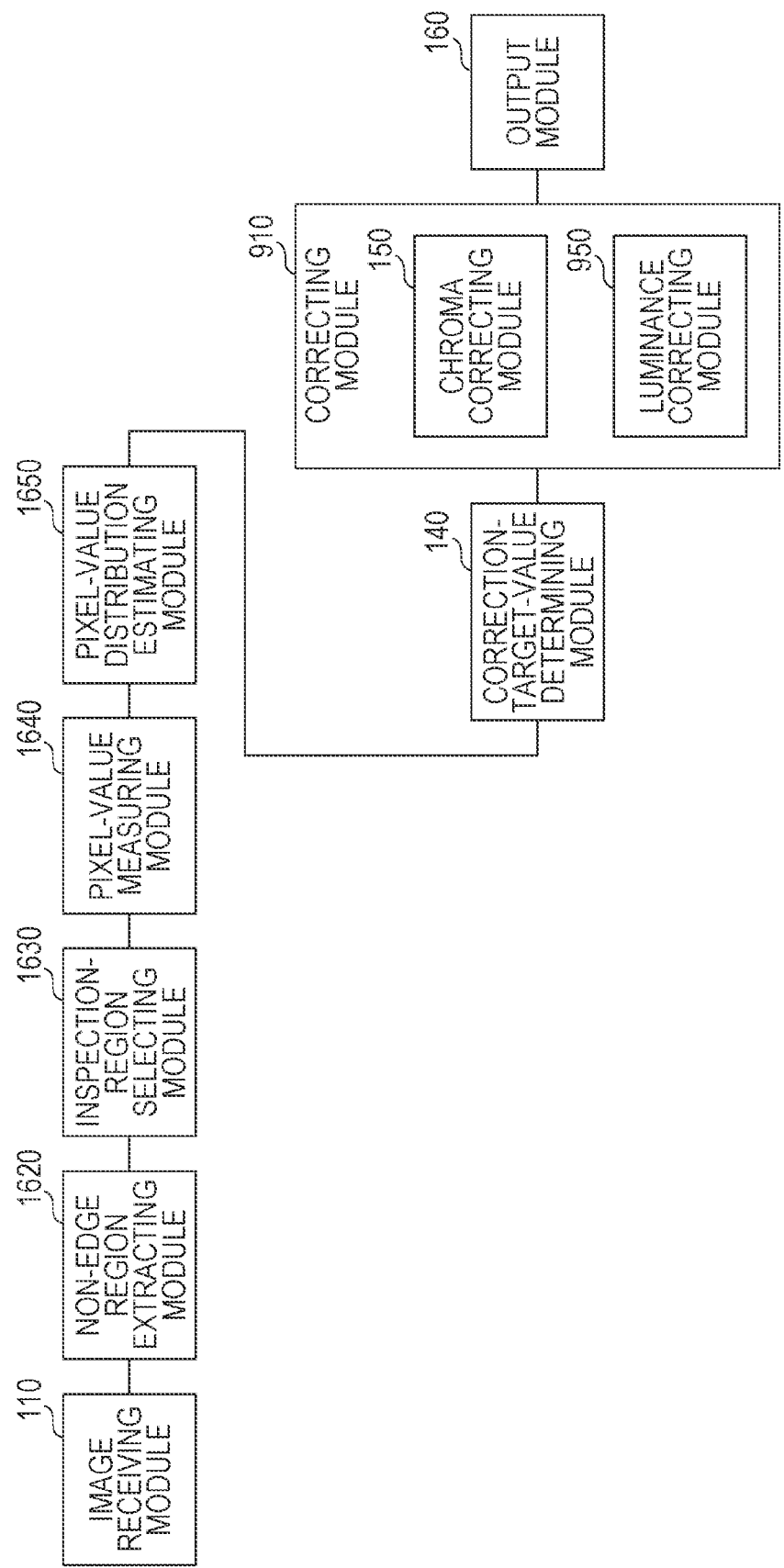
FIG. 16 is a block diagram illustrating conceptual modules forming an image processing apparatus according to a fifth exemplary embodiment.

FIG. 16 is a block diagram illustrating conceptual modules forming an image processing apparatus according to the fifth exemplary embodiment. The image processing apparatus shown in FIG. 16 of the fifth exemplary embodiment serves the function to eliminate fog from images. The image processing apparatus shown in FIG. 16 includes by way of example an image receiving module 110, a non-edge region extracting module 1620, an inspection-region selecting module 1630, a pixel-value measuring module 1640, a pixel-value distribution estimating module 1650, a correction-target-value determining module 140, a correcting module 910, and an output module 160. The correcting module 910 includes a chroma correcting module 150 and a luminance correcting module 950.

The image receiving module 110 is connected to the non-edge region extracting module 1620. The image receiving module 110 receives an image and delivers the received image to the non-edge region extracting module 1620. An example of processing performed by the image receiving module 110 will be discussed later with reference to FIG. 18.

The non-edge region extracting module 1620 is connected to the image receiving module 110 and the inspection-region selecting module 1630. The non-edge region extracting module 1620 extracts regions from an image received by the image receiving module 110 and delivers the extracted regions to the inspection-region selecting module 1630.

The non-edge region extracting module 1620 also extracts regions equal to or larger than a predetermined size or regions larger than the predetermined size, and if the non-edge region extracting module 1620 has not found such regions, operations of the inspection-region selecting module 1630, the pixel-value measuring module 1640, the pixel-value distribution estimating module 1650, the correction-target-value determining module 140, the correcting module 910, and the output module 160 may not be performed. In this case, the non-edge region extracting module 1620 may output information indicating that the above-described regions have not been found (i.e., elimination of fog has not been performed).

The regions to be extracted are regions in which color values are changed smoothly and continuously, in other words, edgeless regions or regions surrounded by edges.

An example of processing performed by the non-edge region extracting module 1620 will be discussed later with reference to FIGS. 19 and 20.

The inspection-region selecting module 1630 is connected to the non-edge region extracting module 1620 and the pixel-value measuring module 1640. The inspection-region selecting module 1630 selects a region from the regions extracted by the non-edge region extracting module 1620 in accordance with a predetermined rule, and delivers the selected region to the pixel-value measuring module 1640.

The predetermined rule employed in the inspection-region selecting module 1630 may be determined by using the sizes of the regions or the luminance or chroma values of the regions extracted by the non-edge region extracting module 1620. Alternatively, the predetermined rule may be determined by at least one of the variance of the chroma values of the pixels in the extracted regions, the positions of the regions in the image, and the sizes of the outer peripheries of the regions.

An example of processing performed by the inspection-region selecting module 1630 will be discussed later with reference to FIG. 21.

The pixel-value measuring module 1640 is connected to the inspection-region selecting module 1630 and the pixel-value distribution estimating module 1650. The pixel-value measuring module 1640 measures the pixel values (luminance and chroma) of each of the pixels in the region selected by the inspection-region selecting module 1630, and delivers the measurement result to the pixel-value distribution estimating module 1650. The pixel values (luminance and chroma) of the pixels are measured by scanning the region in a predetermined direction.

The scanning direction in which the region is scanned for measuring the pixel values of the pixels may be at least one of a horizontal direction, a vertical direction, an oblique direction, a direction in which the region is scanned in an elliptical shape. The scanning direction may be two directions, such as a combination of the horizontal direction and the vertical direction, a top right oblique direction and a bottom right oblique direction, or may be one direction, such as scanning the region in an elliptical shape, or may be a combination of three scanning directions.

An example of processing performed by the pixel-value measuring module 1640 will be discussed later with reference to FIGS. 22A through 23B.

The pixel-value distribution estimating module 1650 is connected to the pixel-value measuring module 1640 and the correction-target-value determining module 140. The pixel-value distribution estimating module 1650 estimates a function representing the degree of fog in the image received by the image receiving module 110 from the pixel values measured by the pixel-value measuring module 1640, and delivers the estimated function to the correcting module 910. The function representing the degree of fog may be a linear function or a multidimensional function, such as a quadratic function.

The pixel-value distribution estimating module 1650 may estimate a function generated by connecting the luminance values of the pixels in the region selected by the inspection-region selecting module 1630.

An example of processing performed by the pixel-value distribution estimating module 1650 will be discussed later with reference to FIGS. 24A through 25C.

The correction-target-value determining module 140 is connected to the pixel-value distribution estimating module 1650 and the correcting module 910. The correction-target-value determining module 140 determines a correction target value for the luminance values of pixels in background portions within the image received by the image receiving module 110 and delivers the determined correction target value to the correcting module 910.

The luminance correcting module 950 within the correcting module 910 eliminates fog from the image received by the image receiving module 110 on the basis of the function estimated by the pixel-value distribution estimating module 1650, and delivers the image from which fog has been eliminated to the output module 160. That is, the luminance correcting module 950 calculates the amount of fog on the basis of the function estimated by the pixel-value distribution estimating module 1650, and corrects the luminance value of each of the pixels measured by the pixel-value measuring module 1640 on the basis of the calculated amount of fog and the correction target value determined by the correction-target-value determining module 140.

If the pixel-value measuring module 1640 has measured the luminance values of the pixels by scanning the region of the image in plural scanning directions, the luminance correcting module 950 may calculate the value of fog at a position at which the scanning directions intersect with each other, on the basis of the values obtained from plural functions estimated by the pixel-value distribution estimating module 1650. Concerning pixels which are not positioned on the scanning lines, the values of fog at the positions of such pixels may be calculated by using the values of fog at the positions of the pixels on the scanning lines in accordance with the distances between the pixels on the scanning lines and the corresponding pixels which are not on the scanning lines. The values of fog indicate the differences between the pixel values of the received image and the pixel values of the original image (pixel values of an image which has been photographed without the occurrence of fog).

An example of processing performed by the luminance correcting module 950 will be discussed later with reference to FIGS. 26 through 28.

The chroma correcting module 150 within the correcting module 910 calculates an amount of fog on the basis of the function estimated by the pixel-value distribution estimating module 1650, and corrects the chroma value of each of the pixels measured by the pixel-value measuring module 1640 on the basis of the calculated amount of fog, the correction target value determined by the correction-target-value determining module 140, and the distance from the chroma value to an achromatic color. The chroma correcting module 150 performs processing comparable to that performed by the counterpart of the first through fourth exemplary embodiments. Calculation of the amounts of fog on the basis of the function estimated by the pixel-value distribution estimating module 1650 is performed similarly to that performed by the luminance correcting module 950. The chroma correcting module 150 may employ a processing result obtained by the luminance correcting module 950. Conversely, the luminance correcting module 950 may employ a processing result obtained by the chroma correcting module 150.

The output module 160 is connected to the correcting module 910. The output module 160 receives an image corrected by the chroma correcting module 150 and the luminance correcting module 950 (an image from which fog has been eliminated) and outputs the corrected image.

Figure 17:
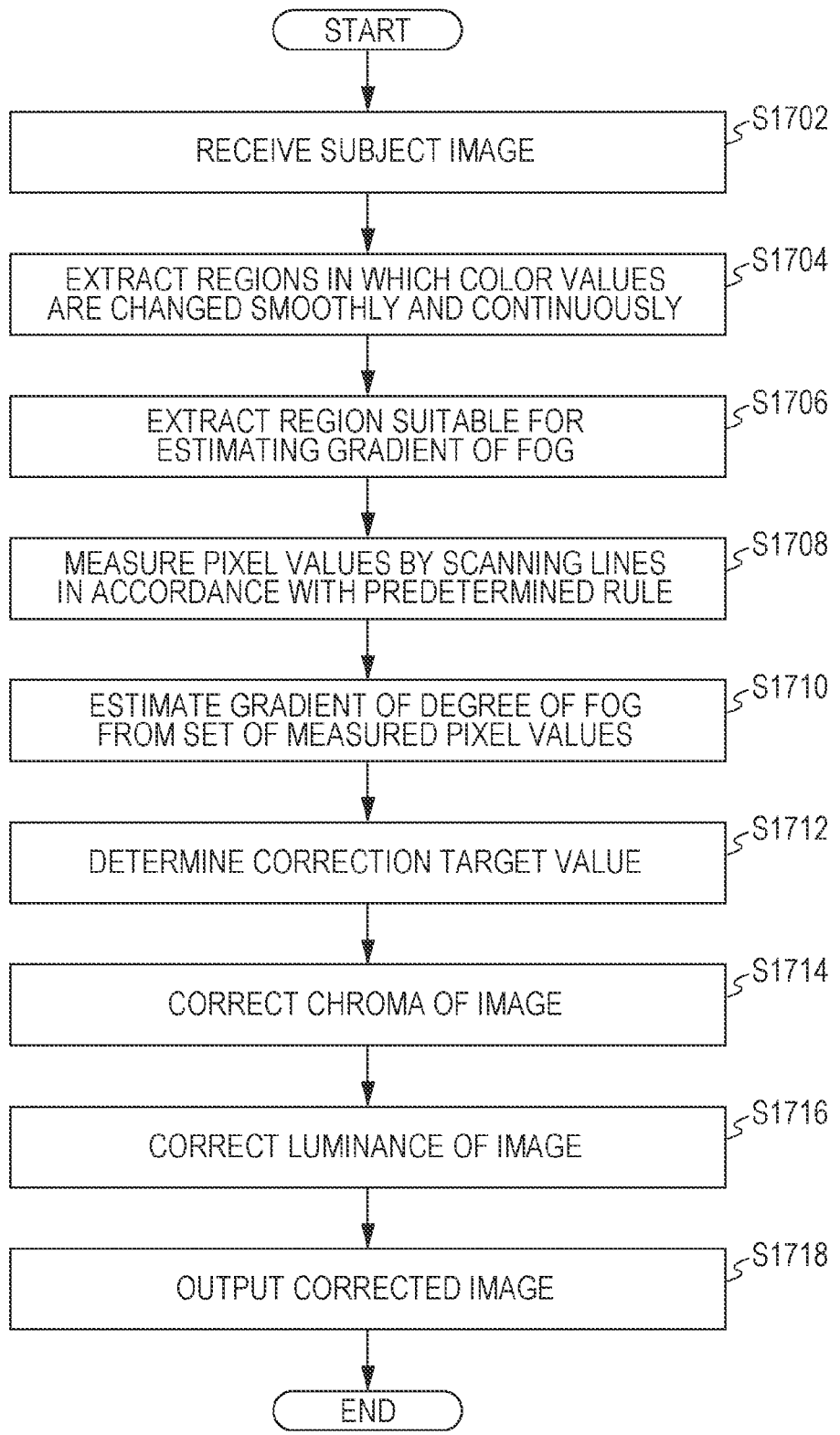
FIG. 17 is a flowchart illustrating an example of processing according to the fifth exemplary embodiment.

FIG. 17 is a flowchart illustrating an example of processing according to the fifth exemplary embodiment.

In step S1702, the image receiving module 110 receives a subject image.

Figure 18:
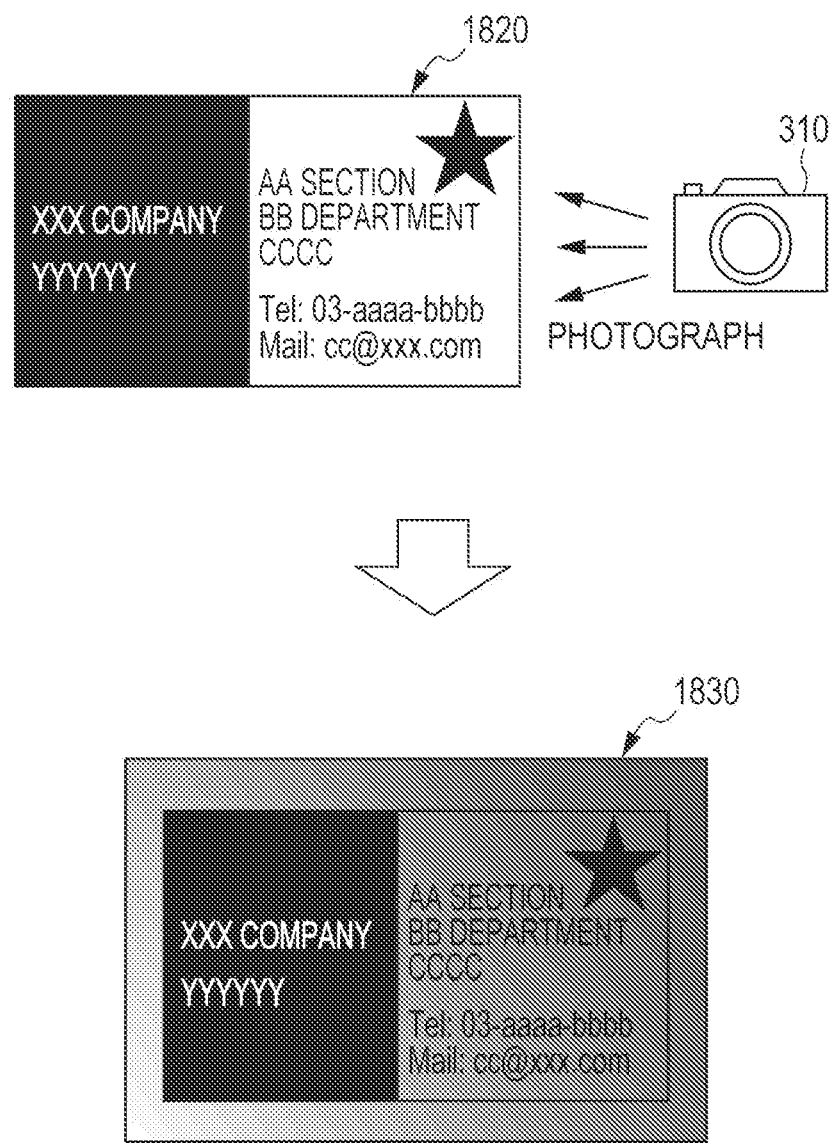
FIG. 18 illustrates an example of processing performed by an image receiving module.

FIG. 18 illustrates an example of processing performed by the image receiving module 110. A subject document 1820 to be photographed is equivalent to the subject document 3310 shown in FIG. 33A. The subject document 1820 includes a region having a red background at the left side, a region having a white background at the right side, and a region representing a red mark at the top right. When the subject document 1820 is photographed by using an image capturing device 310, fog occurs and is reflected in a resulting image, such as that in a photographed image 1830. For example, after exchanging name cards, the subject document 1820 representing one of the name cards is placed on a desk and is photographed with the image capturing device 310. The image capturing device 310 may be an independent digital camera, a digital camera built in a personal digital assistant e.g., in a cellular phone including a smartphone, or a scanner, etc.

In step S1704, the non-edge region extracting module 1620 extracts regions in which color values are changed smoothly and continuously.

Figure 19:
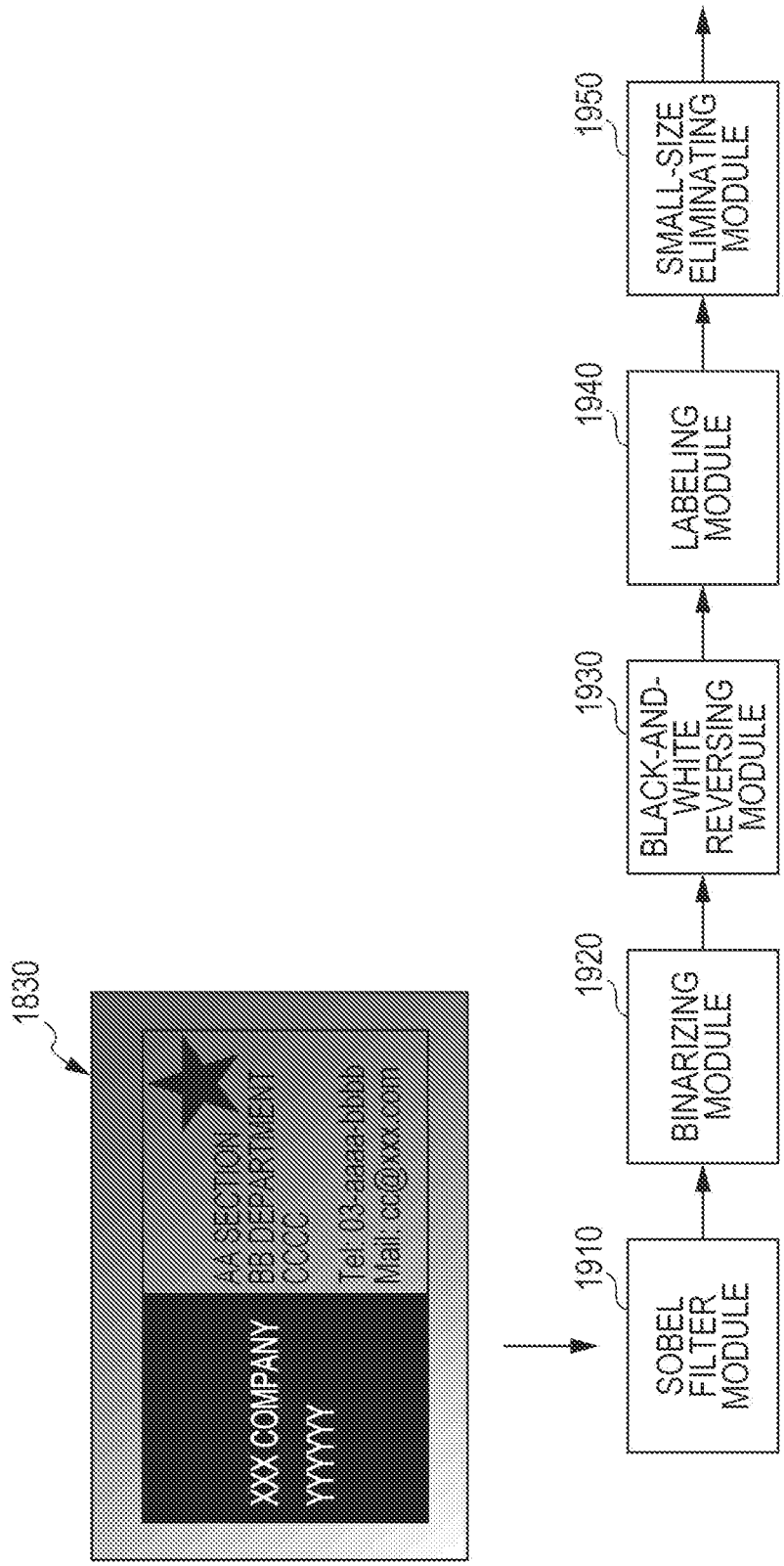
FIGS. 19 and 20 illustrate an example of processing performed by a non-edge region extracting module.
Figure 20:
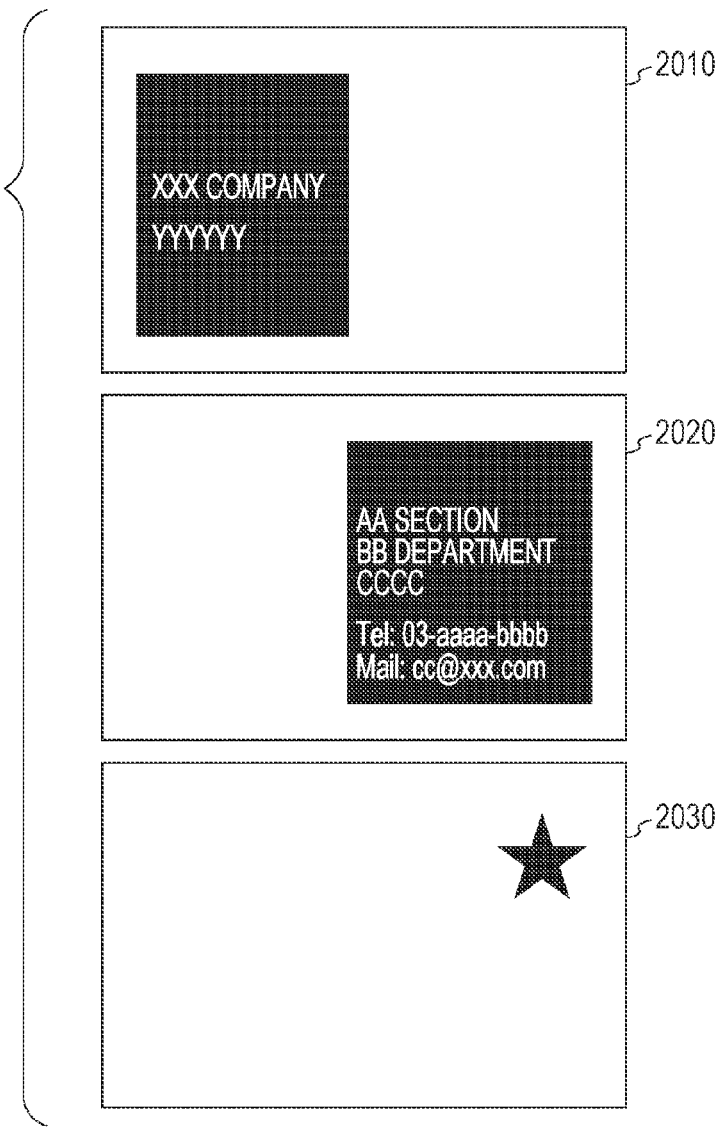

FIGS. 19 and 20 illustrate an example of processing performed by the non-edge region extracting module 1620. The non-edge region extracting module 1620 includes, for example, a sobel filter module 1910, a binarizing module 1920, a black-and-white reversing module 1930, a labeling module 1940, and a small-size eliminating module 1950.

The sobel filter module 1910 is connected to the binarizing module 1920, and performs sobel filter processing on the photographed image 1830 received in step S1702 and delivers the resulting image to the binarizing module 1920. The sobel filter processing is to detect edges of vertical lines or horizontal lines by using a filter. In the sobel filter processing, lines other than vertical lines and horizontal lines may be detected depending on the design of the filter.

The binarizing module 1920 is connected to the sobel filter module 1910 and the black-and-white reversing module 1930. Upon receiving an image in which edges have been detected by the sobel filter module 1910, the binarizing module 1920 performs binarizing processing on the image and delivers the binarized image to the black-and-white reversing module 1930. As this binarizing processing, a known binarizing processing technique may be applied. As a result of this binarizing processing, the edges have turned out to be black and the other portions have turned out to be white.

The black-and-white reversing module 1930 is connected to the binarizing module 1920 and the labeling module 1940. Upon receiving the binarized image from the binarizing module 1920, the black-and-white reversing module 1930 performs black-and-white reverse processing on the binarized image and delivers the resulting image to the labeling module 1940. As a result of this black-and-white reverse processing, the edges are changed to white, and the other portions are changed to black.

The labeling module 1940 is connected to the black-and-white reversing module 1930 and the small-size eliminating module 1950. Upon receiving an image subjected to black-and-white reverse processing by the black-and-white reversing module 1930, the labeling module 1940 performs labeling processing on the image and delivers the resulting image to the small-size eliminating module 1950. As a result of this labeling processing, the same label is attached to a black region that exhibits continuous black pixels. Accordingly, by extracting the regions attached with the same label, regions without an edge can be extracted.

The small-size eliminating module 1950 is connected to the labeling module 1940. Upon receiving an image labeled by using the labeling module 1940, the small-size eliminating module 1950 eliminates noise, which corresponds to regions equal to or smaller than a predetermined size or regions smaller than the predetermined size. In other words, as a result of this processing, regions equal to or greater than the predetermined size or regions greater than the predetermined size can be extracted. The area of a region attached with the same label may be determined by counting the number of pixels attached with the same label or by calculating the area of a circumscribed rectangle of that region.

An example of the image obtained by performing the above-described processing on the photographed image 1830 shown in FIG. 19 is shown in FIG. 20. A region image 2010 is a region having a red background at the left side of the photographed image 1830. A region image 2020 is a region having a white background at the right side of the photographed image 1830. A region image 2030 is a region having a red mark at the top right of the photographed image 1830. However, those images are binary images, and serve as mask images. More specifically, a logical AND operation between the photographed image 1830 and the mask images is performed, thereby making it possible to extract the regions corresponding to the mask images from the photographed image 1830.

The non-edge region extracting module 1620 may extract non-edge regions by performing processing other than the processing using the module configuration shown in FIG. 19. For example, the non-edge region extracting module 1620 may extract non-edge regions by integrating the same color pixels. The same color pixels are not restricted to exactly the same color pixels, but may be color pixels having a predetermined relationship. More specifically, a certain pixel may be selected from an image, and pixels which are in contact with the selected pixel and which have a predetermined relationship with the selected pixel (e.g., the distance between the two pixels is equal to or smaller than a predetermined value or the distance between the two pixels is smaller than the predetermined value in a color space) may be integrated. Then, the above-described integration processing may be similarly performed on the integrated pixel. As a result, a non-edge region is extracted.

Referring back to the flowchart of FIG. 17, in step S1706, the inspection-region selecting module 1630 extracts a region suitable for estimating the gradient of fog.

The inspection-region selecting module 1630 extracts the characteristic values of the regions extracted in step S1704. Then, the inspection-region selecting module 1630 calculates the value according to equation (10) (discriminant function) for each region, and selects a region (in this example, the above-described mask image) in accordance with the calculated values. For example, among the regions extracted in step S1704, the region having the maximum value is selected.

$$f(X_i; w) = \sum_j w_j x_{ij} \quad (10)$$

In equation (10), $w_j$ in the right side is a weight, and may be a positive number, 0, or a negative number. If $w_j$ is 0, it means that the corresponding characteristic value (weight) is not used. If $w_j$ is a negative number, the characteristic value acts in the negative direction. The weight $w_j$ is a predetermined value which may be set by an operator or which may be a value obtained by conducting learning by using supervisor data in which a correct answer is determined among several choices.

In equation (10) $x_{ij}$ in the right side denotes characteristic values. The inspection-region selecting module 1630 extracts those characteristic values from each region (i). The characteristic values $x_{ij}$ include:

$x_{i0}$ is the width or the height of a region, or may be a width×height (i.e., the area of a circumscribed rectangle);

$x_{i1}$ is the area of a region;

$x_{i2}$ is the pixel density of a region;

$x_{i3}$ is the average of the luminance values (e.g., the value of L* in the case of an L*ab color space) of the pixels within a region;

$x_{i4}$ is the average of the chroma values (e.g., the values of a and b in the case of an L*ab color space) of the pixels within a region;

$x_{i5}$ is the variance of the chroma values of the pixels within a region;

$x_{i6}$ is the distance from the center of gravity of a region (mask image) to the center of the image received in step S1702; and $x_{i7}$ is the length of the peripheral contour of a region/the boundary length of a circumscribed rectangle of the region.

The above-described characteristic values are merely examples, and other characteristic values may be used. Additionally, as one of the characteristic values, the average of the luminance or chroma values is used for describing the typical luminance or chroma of the pixels in a region. However, instead of using the average, a value representing the typical luminance or chroma of a region may be used, for example, a modal value or a median value may be used.

It is not necessary to use all the characteristic values, and some of them may be selected. For example, a discriminant function using one of the characteristic values $x_{i0}$, $x_{i1}$, and $x_{i2}$ may be employed. This is because a large area is suitable for estimating a function representing the degree of fog.

Further, $x_{i3}$ or $x_{i4}$ may be added in order to select a background region of the document. This is because a background region is also suitable for estimating a function indicating the degree of fog. The background region is generally white, and thus, it has a high luminance value and a low chroma value. The weight $w_4$ of the chroma value $x_{i4}$ is a negative value.

The above-described characteristic values are sufficient to estimate the degree of fog superposed on images, such as name cards, documents, and whiteboards having a white background. However, such characteristic values may not be sufficient for images obtained by photographing a document, such as a name card, in which a landscape picture occupies the half of the document (the area of the white background is relatively narrow), or for images obtained by photographing a whiteboard facing toward the light (the surrounding portion of the photographed image has a high luminance value).

Accordingly, $x_{i5}$ through $x_{i7}$ may be added.

Generally, the variance of chroma values of a landscape picture is higher than that of a background. Thus, $x_{i5}$ may be used so that a region having a smaller variance of chroma values can be selected while preventing a landscape picture from being selected. The weight $w_5$ of the variance of the chroma values $x_{i5}$ is a negative value.

Generally, when photographing an image, a user intentionally places a target region at the center of the image. Accordingly, $x_{i6}$ may be used so that a region of which the center of gravity (or the center) is placed around the center of the image can be selected. The weight $w_6$ of the distance $x_{i6}$ is a negative value.

The outer periphery of a region of a landscape picture contains more uneven portions than that of a circumscribed rectangle. In contrast, the background of, for example, a name card, is a rectangle, and, in most cases, the outer periphery of the rectangle is linear. Accordingly, $x_{i7}$ may be used so that a region having a short peripheral contour can be selected while preventing a landscape picture from being selected. The weight $w_7$ of the peripheral contour $x_{i7}$ is a negative value.

FIG. 21 illustrates an example of processing performed by the inspection-region selecting module 1630. The calculation result of the discriminant function for the region image 2010 is 1.5, as expressed by equation (11).

$$f(X_1; w) = \sum_j w_j x_{1j} \quad (11)$$
$$= 1.5$$

The calculation result of the discriminant function for the region image 2020 is 2.0, as expressed by equation (12).

$$f(X_2; w) = \sum_j w_j x_{2j} \quad (12)$$
$$= 2.0$$

The calculation result of the discriminant function for the region image 2030 is 0.2, as expressed by equation (13).

$$f(X_3; w) = \sum_j w_j x_{3j} \quad (13)$$
$$= 0.2$$

Then, the maximum of the calculated values of the discriminant functions, as expressed by equation (14), is selected.

$$X^* = \underset{i}{\operatorname{argmax}} f(X_i; w) \quad (14)$$

In this case, the region corresponding to the region image 2020 is selected, as expressed by equation (15).

$$X^* = X_2 \quad (15)$$

In step S1708, the pixel-value measuring module 1640 scans the lines of the region in accordance with a predetermined rule so as to measure the pixel values in the region.

FIGS. 22A through 23B illustrate an example of processing performed by the pixel-value measuring module 1640.

An extracted region image 2200 is an image obtained by performing a logical AND operation between the photographed image 1830 received in step S1702 and the region image 2020 selected in step S1706. That is, the region having a white background at the right side of the photographed image 1830 is extracted. Scanning is performed on the extracted region image 2200 in the vertical and horizontal directions at predetermined intervals (e.g., at equal intervals). For example, lines 2202 through 2218 are scanned in the horizontal direction and lines 2222 through 2242 are scanned in the vertical direction. Then, a graph is plotted by connecting the luminance values of the pixels. An example of a graph representing the luminance values of pixels obtained by scanning the line 2202 is shown in FIG. 22B. Since the line 2202 is not contained in the selected region, the graph is constituted of only invalid data. An example of the graph obtained by scanning the line 2212 is shown in FIG. 22C. Since part of the line 2212 is contained in the selected region, the graph is constituted of valid data and invalid data. In the graph shown in FIG. 22C, the luminance value decreases toward the right side. This is because the fog image becomes darker, on the whole, toward the upper right side.

A determination regarding whether the graph contains valid data or invalid data can be made by scanning the region image (mask image, i.e., the region image 2020 shown in FIG. 21) selected by the inspection-region selecting module 1630. Positions within the black portion in the region image 2020 correspond to positions containing valid data in the extracted region image 2200, while positions within the white portion in the region image 2020 correspond to positions containing invalid data in the extracted region image 2200. In the graphs of this example, the luminance value of the invalid data is 0.

Figure 22A:
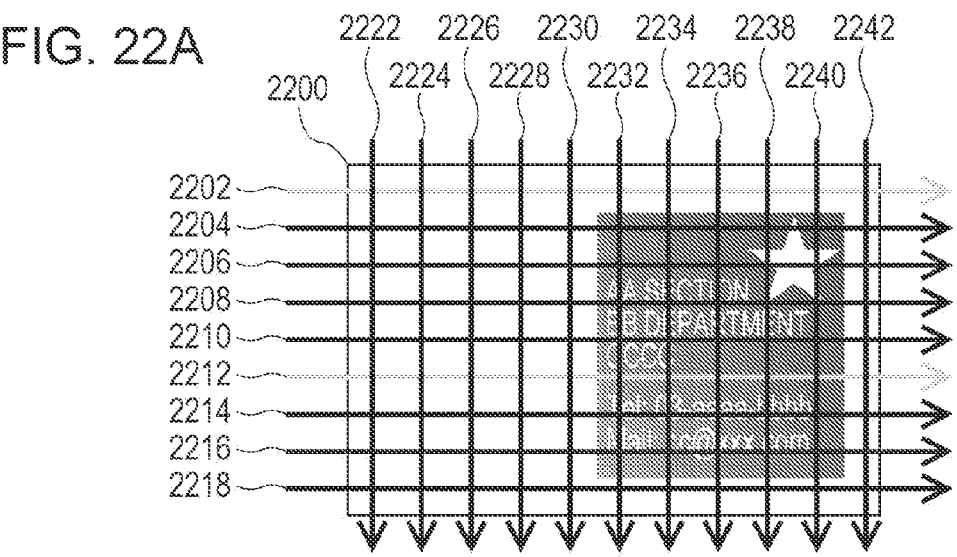
FIGS. 22A through 23B illustrate an example of processing performed by a pixel-value measuring module.
Figure 22B:
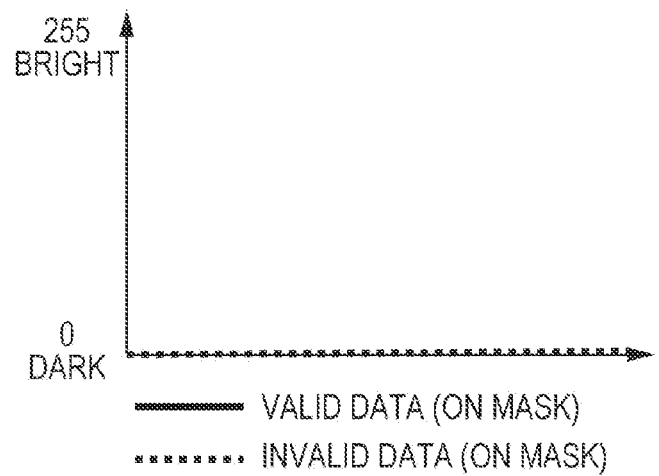
Figure 22C:
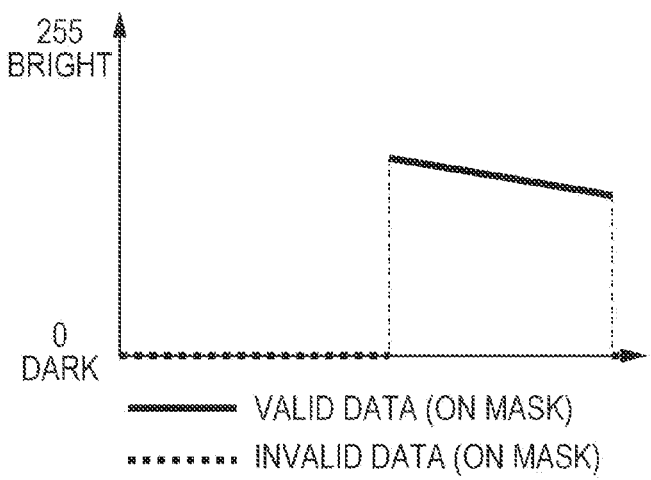
Figure 23A:
Figure 23B:
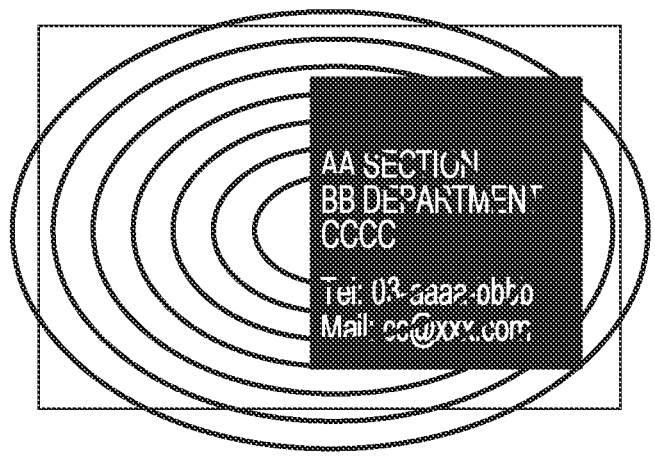

As the predetermined rule employed when scanning the extracted region image 2200, not only the vertical and horizontal scanning shown in FIG. 22A, but also scanning shown in FIG. 23A may be performed. More specifically, in the scanning shown in FIG. 23A, scanning may be performed at predetermined intervals in an oblique direction from the top left side to the bottom right side and an oblique direction from the top right side to the bottom left side. Alternatively, scanning may be performed, as shown in FIG. 23B, in an elliptical shape at predetermined intervals. In this case, examples of the elliptical shape may include a circle. The scanning direction may be selected by an operator in accordance with the gradient of the luminance values of fog, or may be determined in advance in accordance with an image capturing device.

In step S1710, the pixel-value distribution estimating module 1650 estimates the gradient of degree of fog (function representing the degree of fog) from a set of the measured pixel values. As the function representing the degree of fog estimated in this example, a linear function is used by way of example.

FIGS. 24A through 25C illustrate an example of processing performed by the pixel-value distribution estimating module 1650.

Figure 24C:
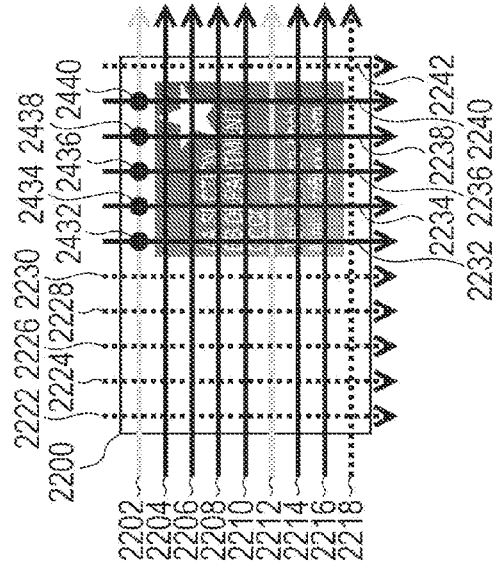
FIGS. 24A through 25C illustrate an example of processing performed by a pixel-value distribution estimating module.
Figure 24B:
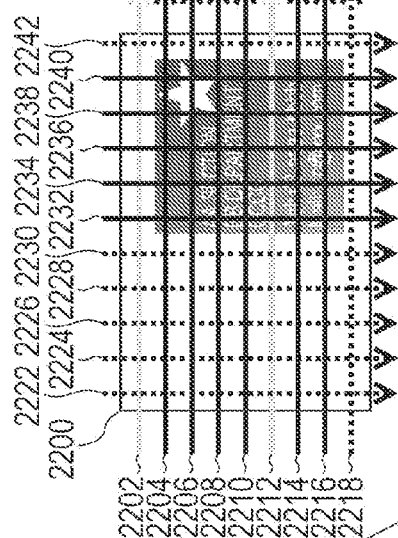
Figure 24A:
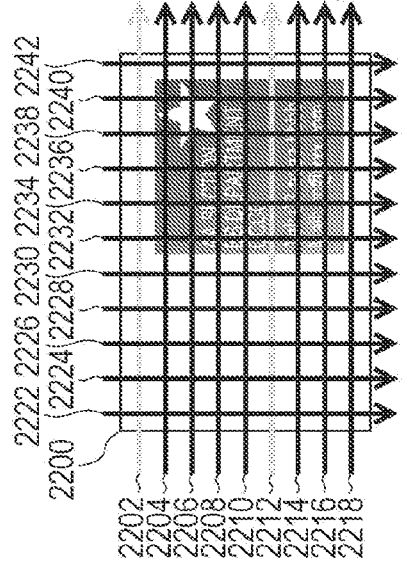

As shown in the example of FIG. 24A, the function representing the degree of fog in the vertical scanning is represented by equation (16), and the function representing the degree of fog in the horizontal direction is represented by equation (17).

$$c_j(y; \gamma_j, \delta_j) = \gamma_j + \delta_j x \quad (16)$$

$$r_i(x; \alpha_i, \beta_i) = \alpha_i + \beta_i x \quad (17)$$

In the example shown in FIG. 24B, lines including valid data are indicated by the solid lines, while lines including only invalid data are indicated by the dotted lines. The lines including valid data are the lines 2204 through 2216 and the lines 2232 through 2240. The lines including only invalid data are the lines 2202 and 2218 and the lines 2222 through 2230 and 2242.

Figure 25A:
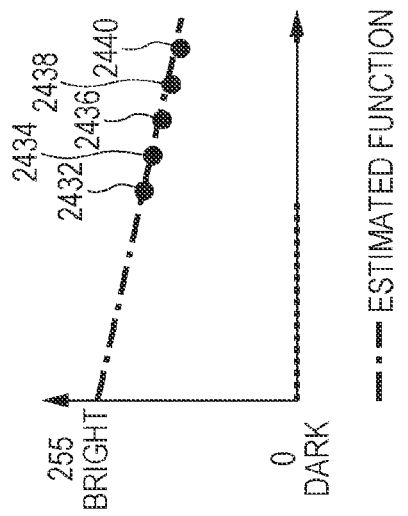
Figure 25B:
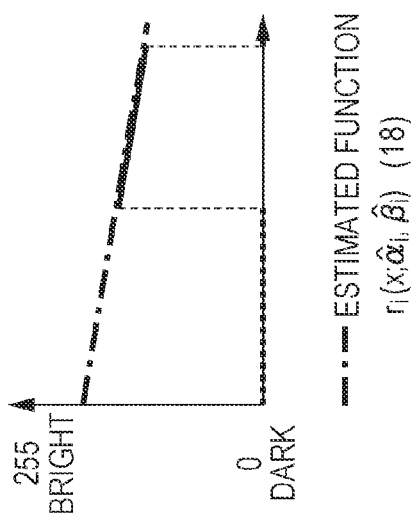

FIG. 25A illustrates a graph representing a line including valid data. Each of the lines 2204 through 2216 can be represented by a graph similar to the graph shown in FIG. 25A. A function represented by each of the graphs of the luminance values is estimated by using the least squares method, etc. For example, the function represented by a graph of the luminance values obtained by scanning the horizontal lines can be expressed by equation (18). In each of the lines, if the number of valid data elements is smaller than a predetermined number, the function is estimated without using those valid data elements. In the example shown in FIG. 25B, equation (18) is represented by the one-dot chain line.

$$r_i(x; \hat{\alpha}_i, \hat{\beta}_i) \quad (18)$$

Figure 25C:
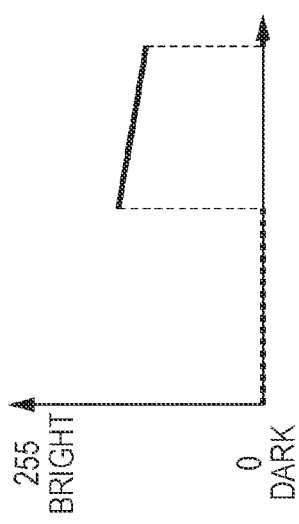

The function is also applicable to the lines without valid data. Accordingly, in order to determine luminance values at estimation points 2432 through 2440 on the line 2202 without valid data, as shown in FIG. 24C, the function is applied, as shown in FIG. 25C, to determine the luminance values at the estimation points 2432 through 2440. This means that the estimated function applies to the entire image.

Estimation of the function using vertical lines is performed similarly to estimation of the function using horizontal lines.

In step S1712, the correction-target-value determining module 140 determines a correction target value, as in the counterparts of the first through fourth exemplary embodiments. The correction target value may be determined differently from the above-described technique. For example, the luminance values of the pixels at plural points of intersection (e.g., points of intersection within the region selected by the inspection-region selecting module 1630) are collected so as to generate a luminance histogram. Then, in the luminance histogram, the luminance value at a predetermined point of intersection (e.g., a point of intersection having a luminance value lower than the brightest luminance by 10%) may be set.

In step S1714, the chroma correcting module 150 corrects the chroma of the image. The chroma correcting module 150 calculates the amount of fog on the basis of the function estimated in step S1710, and corrects the chroma values of each of the pixels measured in step S1708 on the basis of the calculated amount of fog, the correction target value determined in step S1712, and the distance from the chroma value to an achromatic color. The chroma correcting module 150 performs processing equivalent to that performed by the counterparts of the first through fourth exemplary embodiments. Calculation of the amounts of fog on the basis of the function estimated by the pixel-value distribution estimating module 1650 is performed similarly to that performed by the luminance correcting module 950 in step S1716.

In step S1716, the luminance correcting module 950 corrects the luminance of the image. That is, the luminance correcting module 950 calculates the amount of fog to be eliminated by using the gradient of degree of fog (function estimated in step S1710), thereby correcting the pixel value of the image at each set of coordinates of the graph. As a result of the correction performed in step S1716, fog is eliminated from the photographed image so as to reconstruct the original image.

Figure 26:
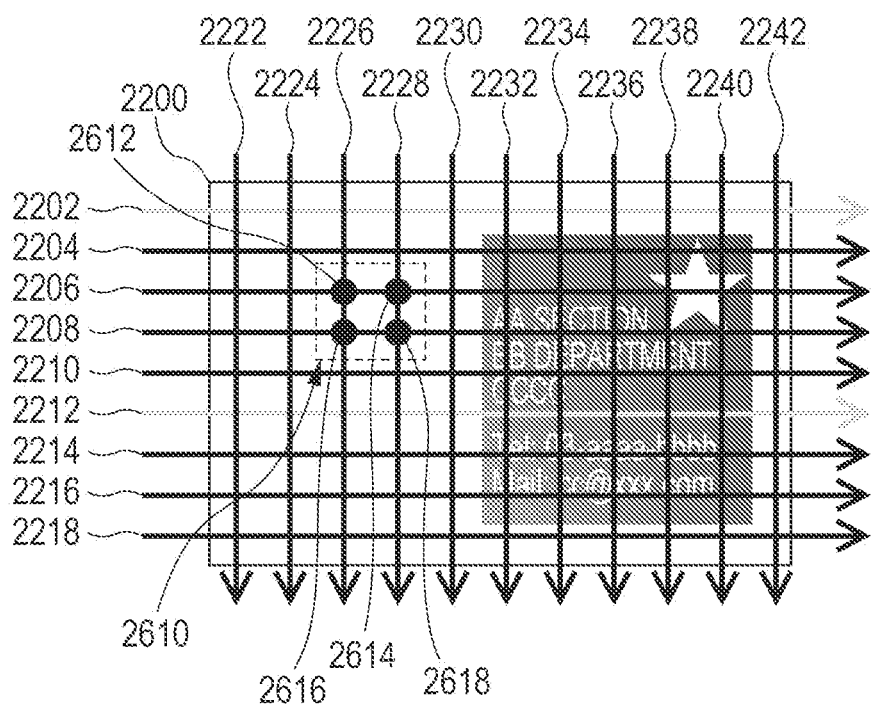
FIGS. 26 through 28 illustrate an example of processing performed by a luminance correcting module.
Figure 27:
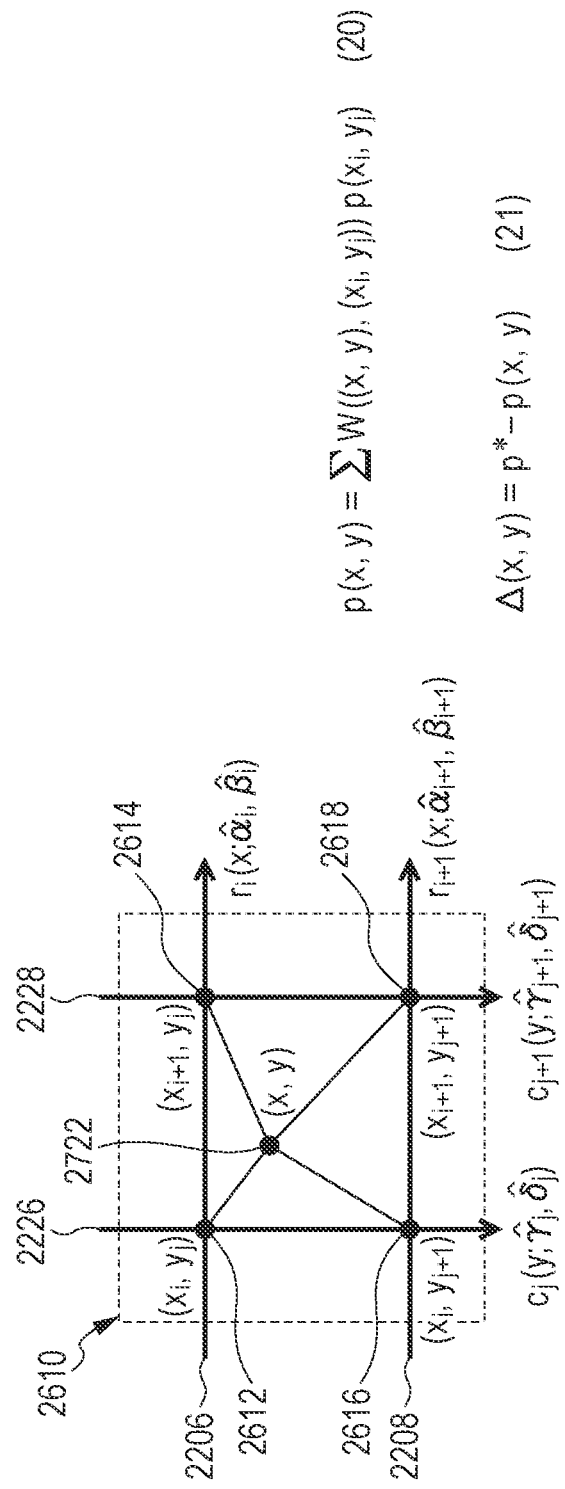
Figure 28:
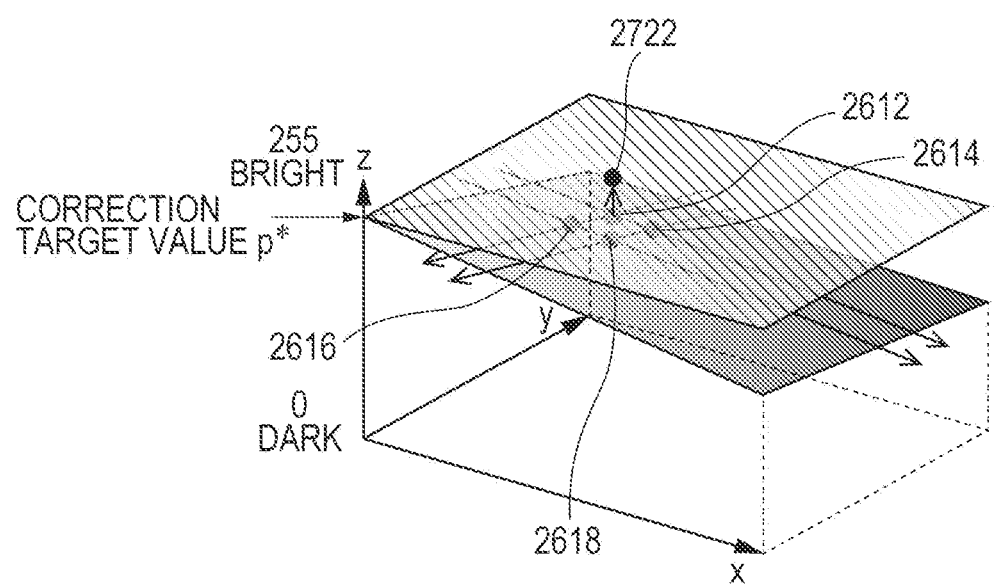

FIGS. 26 through 28 illustrate an example of processing performed by the chroma correcting module 150.

Calculation of the amounts of fog at four points of intersection 2612, 2614, 2616, and 2618 within a region 2610 shown in FIG. 26 will be described below with reference to FIG. 27. The point of intersection 2612 is the intersection between the lines 2206 and 2226. The point of intersection 2614 is the intersection between the lines 2206 and 2228. The point of intersection 2616 is the intersection between the lines 2208 and 2226. The point of intersection 2618 is the intersection between the lines 2208 and 2228. Those points of intersection 2612 through 2618 are contained in a region without valid data.

The luminance value at the point of intersection 2612 is calculated by using equation (19).

$$p(x_i, y_j) = \frac{r_i(x_i; \hat{\alpha}_i, \hat{\beta}_i) + c_j(y_j; \hat{\gamma}_j, \hat{\delta}_j)}{2} \quad (19)$$

The luminance value calculated by using equation (19) is the average of the function $r_i$ of the line 2206 and the function $c_j$ of the line 2226 at the point of intersection 2612 $(x_i, y_j)$. Similarly, the luminance value at the point of intersection 2614 is the average of the function $r_i$ of the line 2206 and the function $c_{j+1}$ of the line 2228 at the point of intersection 2614 $(x_{i+1}, y_j)$. The luminance value at the point of intersection 2616 is the average of the function $r_{i+1}$ of the line 2208 and the function $c_j$ of the line 2226 at the point of intersection 2616 $(x_i, y_{j+1})$. The luminance value at the point of intersection 2618 is the average of the function $r_{i+1}$ of the line 2208 and the function $c_{j+1}$ of the line 2228 at the point of intersection 2618 $(x_{i+1}, y_{j+1})$. In this manner, the pixel value of a pixel at a point of intersection is set as the average value of the function of the corresponding horizontal line and the function of the corresponding vertical line.

Then, the luminance value of a pixel which is not positioned at a point of intersection, e.g., the luminance value of a pixel positioned at an intermediate point 2722 shown in FIG. 27, is calculated by using equation (20).

$$p(x,y) = \Sigma W((x,y),(x_i,y_j))p(x_i,y_j) \quad (20)$$

In equation (20), the luminance value of the pixel at the intermediate point 2722 is calculated by using the luminance values of the pixels at the four points of intersection surrounding the intermediate point 2722. Accordingly, calculating the luminance value of a pixel which is not positioned at a point of intersection is performed after calculating the luminance values of the pixels at the surrounding points of intersection.

In equation (20), the position of the intermediate point 2722 is represented by $(x, y)$. $W((x, y), (x_i, y_j))$ on the right side is the distance weight. That is, $W((x, y), (x_i, y_j))$ is a weight that uses the distance from the intermediate point 2722 to each of the four points of intersection 2612, 2614, 2616, and 2618. The total of the weights of the four points of intersection is one, and the weight is the reciprocal of the distance. Accordingly, if the distances from the intermediate point 2722 to the four points of intersection 2612 through 2618 are equal to each other, the luminance value at the intermediate point 2722 is obtained by adding together ¼ of the luminance values at the points of intersection 2612 through 2618.

Then, the amount of fog is calculated by using equation (21):

$$\Delta(x,y) = p^* - p(x,y) \quad (21)$$

where p* is the luminance value, which serves as a predetermined correction target value.

FIG. 28 illustrates a process of eliminating fog from an image, which is represented three-dimensionally. In FIG. 28, the x axis and the y axis designate a position in the image, and the z axis is a space representing the luminance value. Along the z axis, the gray plane is a fog image, which covers the entire image. The pale hatched plane designates the corrected luminance value of the image. As shown in FIG. 28, p* is the bright luminance value determined from the above-described luminance histogram. The luminance values at the individual points of intersection are increased to p*, thereby eliminating fog. FIG. 28 shows that the luminance at the intermediate point 2722 is being increased.

In step S1718, the output module 160 outputs a corrected image. For example, a printer prints the image from which fog has been eliminated.

Sixth Exemplary Embodiment

Figure 29:
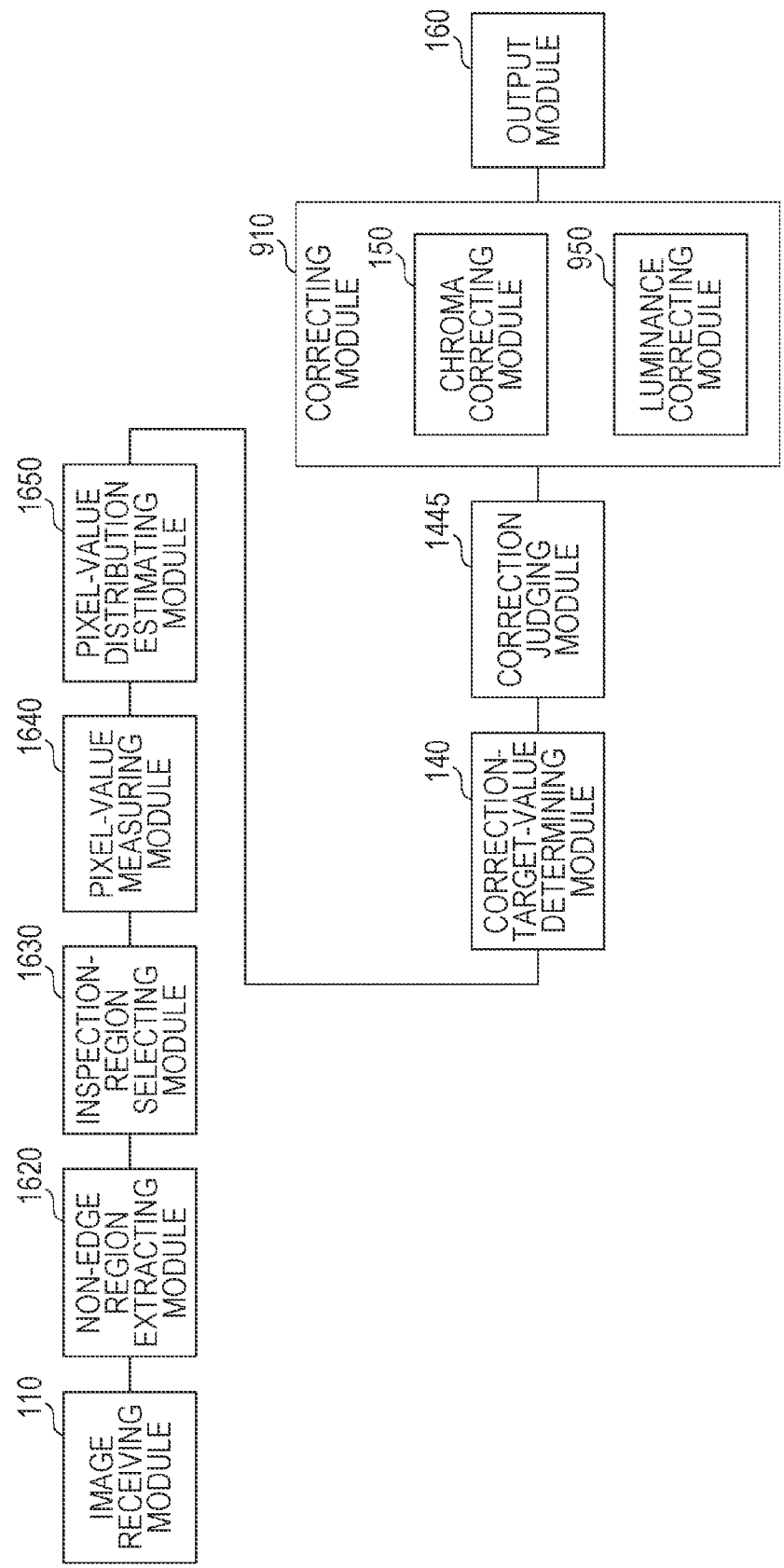
FIG. 29 is a block diagram illustrating conceptual modules forming an image processing apparatus according to a sixth exemplary embodiment.

FIG. 29 is a block diagram illustrating conceptual modules forming an image processing apparatus according to the sixth exemplary embodiment.

The image processing apparatus shown in FIG. 29 of the sixth exemplary embodiment serves the function to eliminate fog from images. The image processing apparatus shown in FIG. 29 includes by way of example an image receiving module 110, a non-edge region extracting module 1620, an inspection-region selecting module 1630, a pixel-value measuring module 1640, a pixel-value distribution estimating module 1650, a correction-target-value determining module 140, a correction judging module 1445, a correcting module 910, and an output module 160. The correcting module 910 includes a chroma correcting module 150 and a luminance correcting module 950.

The correction judging module 1445 is connected to the correction-target-value determining module 140 and the correcting module 910. The correction judging module 1445 calculates an amount of fog on the basis of a function estimated by the pixel-value distribution estimating module 1650, and judges whether to perform correction by using the chroma correcting module 150 and the luminance correcting module 950, on the basis of the difference between the amount of fog and a correction target value determined by the correction-target-value determining module 140.

The correction judging module 1445 may calculate an amount of fog on the basis of a function estimated by the pixel-value distribution estimating module 1650, and may judge whether to perform correction by using the chroma correcting module 150 and the luminance correcting module 950 on the basis of the difference between the amounts of fog of pixels within the image received by the image receiving module 110.

The chroma correcting module 150 within the correcting module 910 performs correction when the correction judging module 1445 judges that correction is to be performed.

The luminance correcting module 950 within the correcting module 910 performs correction when the correction judging module 1445 judges that correction is to be performed.

FIG. 30 is a flowchart illustrating an example of processing according to the sixth exemplary embodiment.

In step S3002, the image receiving module 110 receives a subject image.

In step S3004, the non-edge region extracting module 1620 extracts regions in which color values are changed smoothly and continuously.

In step S3006, the inspection-region selecting module 1630 extracts a region suitable for estimating the gradient of fog.

In step S3008, the pixel-value measuring module 1640 scans the lines of the region in accordance with a predetermined rule so as to measure the pixel values in the region.

In step S3010, the pixel-value distribution estimating module 1650 estimates the gradient of degree of fog from a set of the measured pixel values.

In step S3012, the correction-target-value determining module 140 corrects a correction target value.

In step S3014, the correction judging module 1445 judges whether to perform correction processing. If the result of step S3014 is YES, the process proceeds to step S3016. If the result of step S3014 is NO, the process proceeds to step S3020.

In step S3016, the chroma correcting module 150 corrects the chroma of the image.

In step S3018, the luminance correcting module 950 corrects the luminance of the image.

In step S3020, the output module 160 outputs a corrected image.

In comparison with the fifth and sixth exemplary embodiments, a comparative example will be described below with reference to FIGS. 33C through 33F. Within the photographed image 3330 shown in FIG. 33C, a line 3332 is scanned, and the pixel values obtained as a result of scanning are represented by a graph shown in FIG. 33D. That is, since the fog image 3320 becomes darker toward the right side, the luminance value decreases toward the right side accordingly. However, the luminance values of the original image are also reflected in the pixel values shown in FIG. 33D, and thus, the luminance values are progressively changed, as indicated by luminance distributions 3342, 3344, 3346, and 3348. Then, if the luminance values are corrected toward the target value, as shown in FIG. 33F, the resulting image is seen as a corrected image 3340 shown in FIG. 33E. In the corrected image 3340, in a portion without a white background, such as in the region 3312, the luminance becomes too bright so that the original red color has been removed. The reason for this phenomenon is as follows. The target for the correction processing in this comparative example is a paper document, which is entirely white. However, this correction processing is uniformly performed on a document containing a color portion and a white background, despite the fact that the luminance value of a chromatic color portion is lower than that of a white background.

In contrast, in the fifth and sixth exemplary embodiments, the region 3314 is selected, and on the basis of the region 3314, the amount of fog is calculated, thereby correcting the image. As a result, the luminance of a portion without a white background, such as the region 3312, does not become too bright in contrast to the corrected image 3340 shown in FIG. 33E.

An example of the hardware configuration of the image processing apparatus according to the exemplary embodiments will be described below with reference to FIG. 34. The hardware configuration shown in FIG. 34 may be constituted of a personal computer (PC), and includes a data reading device 3417, such as a scanner, and a data output device 3418, such as a printer.

A CPU 3401 is a controller that executes processing in accordance with a computer program in which execution sequences of individual modules, such as the amount-of-fog estimating module 120, the pixel-value measuring module 130, the correction-target-value determining module 140, the chroma correction judging module 145, the chroma correcting module 150, the luminance correction judging module 950, the correction judging module 1445, the non-edge region extracting module 1620, the inspection-region selecting module 1630, the pixel-value measuring module 1640, the pixel-value distribution estimating module 1650, the sobel filter module 1910, the binarizing module 1920, the black-and-white reversing module 1930, the labeling module 1940, and the small-size eliminating module 1950 are described.

A read only memory (ROM) 3402 stores therein programs, computation parameters, etc. used by the CPU 3401. A RAM 3403 stores therein programs used by the execution of the CPU 3401 and parameters that are appropriately changed in the execution of the CPU 3401. The CPU 3401, the ROM 3402, and the RAM 3403 are connected to one another via a host bus 3404, such as a CPU bus.

The host bus 3404 is connected to an external bus 3406, such as a peripheral component interconnect (PCI)/interface bus, via a bridge 2505.

A keyboard 3408 and a pointing device 3409, such as a mouse, are input devices operated by an operator. A display 3410 includes a liquid crystal display (LCD) or a cathode ray tube (CRT), and displays various information as text or image information.

A hard disk drive (HDD) 3411 has a built-in hard disk and drives the hard disk to cause it to record or play back programs executed by the CPU 3401 or information. In the hard disk, received images, estimated amounts of fog, measured pixel values (luminance and chroma), determined correction target values, images of extracted regions, estimated functions, etc. are stored. Additionally, various computer programs, such as various data processing programs, are also stored.

A drive 3412 reads data or a program recorded on a removable recording medium 3413, such as a magnetic disk, an optical disc, a magneto-optical disk, or a semiconductor memory, set in the drive 3412, and supplies the read data or program to the RAM 3403, which is connected to the drive 3412 via an interface 3407, the external bus 3406, the bridge 3405, and the host bus 3404. The removable recording medium 3413 is also usable as a data recording area, which is similar to a hard disk.

A connection port 3414 is a port for connecting an external connection device 3415 to the image processing apparatus, and includes a connecting section, such as a universal serial bus (USB) or IEEE-1394 port. The connection port 3414 is connected to the CPU 3401 via the interface 3407, the external bus 3406, the bridge 3405, and the host bus 3404. A communication device 3416 is connected to a network, and performs data communication processing with external devices. The data reading device 3417 is, for example, a scanner, and reads documents. The data output device 3418 is, for example, a printer, and outputs documents.

Figure 34:
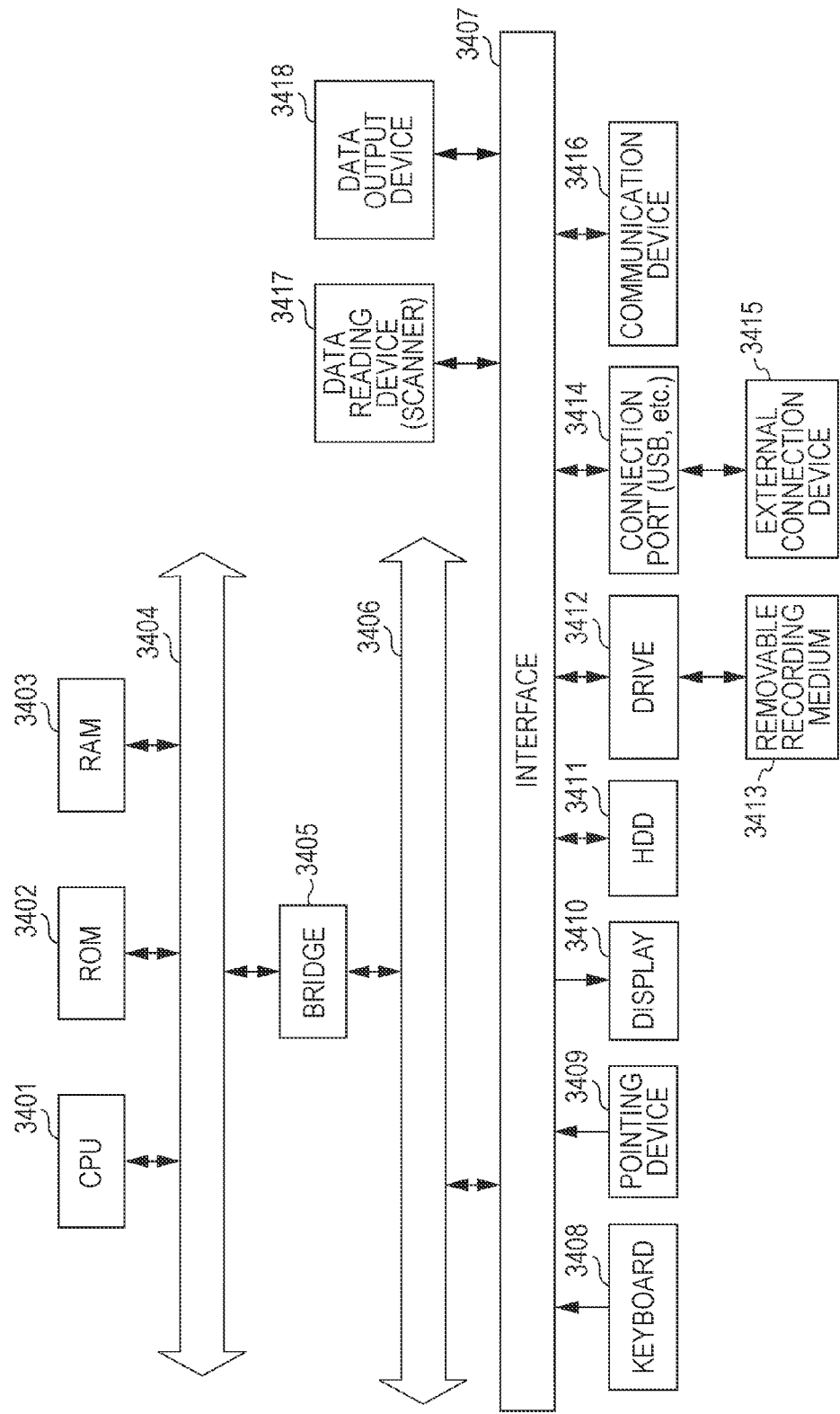
FIG. 34 is a block diagram illustrating an example of the hardware configuration of a computer implementing the exemplary embodiments.

The hardware configuration shown in FIG. 34 is an example only, and any configuration may be employed for the image processing apparatus as long as it can execute the modules described in the exemplary embodiments. For example, some of the modules may be constituted of dedicated hardware, such as an application specific integrated circuit (ASIC), or may be contained in an external system and connected to the image processing apparatus via a communication circuit. Alternatively, two or more of the systems shown in FIG. 34 may be connected via a communication circuit and operated in cooperation with one another. The system may be integrated in a copying machine, a fax machine, a scanner, a printer, a multifunction device (an image processing apparatus including two or more functions of a scanner, a printer, a copying machine, a fax machine, etc.)

The above-described exemplary embodiments may be combined. For example, modules of one exemplary embodiment may be added to another exemplary embodiment, or some modules of one exemplary embodiment may be exchanged for some modules of another exemplary embodiment.

The above-described program may be stored in a recording medium and be provided. The program recorded on a recording medium may be provided via a communication medium. In this case, the above-described program may be implemented as a "computer readable medium storing the program therein" in an exemplary embodiment of the invention.

The "computer readable medium storing a program therein" is a recording medium storing a program therein that can be read by a computer, and is used for installing, executing, and distributing the program.

Examples of the recording medium include digital versatile disks (DVDs), and more specifically, DVDs standardized by the DVD Forum, such as DVD-R, DVD-RW, and DVD-RAM, DVDs standardized by the DVD+RW Alliance, such as DVD+R and DVD+RW, compact discs (CDs), and more specifically, a read only memory (CD-ROM), a CD recordable (CD-R), and a CD rewritable (CD-RW), Blu-ray disc (registered), a magneto-optical disk (MO), a flexible disk (FD), magnetic tape, a hard disk, a ROM, an electrically erasable programmable read only memory (EEPROM) (registered), a flash memory, a RAM, etc.

The entirety or part of the above-described program may be recorded on such a recording medium and stored therein or distributed. Alternatively, the entirety or part of the program may be transmitted through communication by using a transmission medium, such as a wired network used for a local area network (LAN), a metropolitan area network (MAN), a wide area network (WAN), the Internet, an intranet, or an extranet, a wireless communication network, or a combination such networks. The program may be transmitted by using carrier waves.

The above-described program may be part of another program, or may be recorded, together with another program, on a recording medium. The program may be divided and recorded on plural recording media. Further, the program may be recorded in any form, e.g., it may be compressed or encrypted, as long as it can be reconstructed.

The above-described exemplary embodiments may be implemented as follows.

[A1]

An image processing apparatus comprising:
a receiving device that receives an image;
an extracting device that extracts regions from the image received by the receiving device;
a selecting device that selects a region from among the regions extracted by the extracting device in accordance with a predetermined rule;
a measuring device that measures luminance values of pixels contained in the region selected by the selecting device;
an estimating device that estimates a function representing a degree of fog in the image received by the receiving device from the luminance values of the pixels measured by the measuring device; and
an eliminating device that eliminates fog from the image received by the receiving device on the basis of the function estimated by the estimating device.

[A2]

The image processing apparatus according to [A1], wherein the extracting unit extracts regions which are equal to or greater than a predetermined size or regions which are greater than the predetermined size, and if such regions are not found, processing using the selecting device, processing using the measuring device, processing using the estimating device, and processing using the eliminating device are not performed.

[A3]

The image processing apparatus according to [A1] or [A2], wherein the predetermined rule employed in the selecting device has been determined by using a size of each of the regions extracted by the extracting device.

[A4]

The image processing apparatus according to [A3], wherein the predetermined rule employed in the selecting device has also been determined by using luminance or chroma values of pixels contained in each of the regions extracted by the extracting device.

[A5]

The image processing apparatus according to [A3] or [A4], wherein the predetermined rule employed in the selecting device has also been determined by using at least one of a variance of chroma values of pixels contained in each of the regions extracted by the extracting device, a position of each of the regions in the image, and a size of an outer periphery of each of the regions.

[A6]

The image processing apparatus according to one of [A1] to [A5], wherein the measuring device measures the luminance values of the pixels by scanning the region selected by the selecting device in at least one of a horizontal direction, a vertical direction, an oblique direction, and a direction in an elliptical shape.

[A7]

The image processing apparatus according to one of [A1] to [A6], wherein the estimating device estimates a function to be generated by connecting the luminance values of the pixels contained in the region selected by the selecting device.

[A8]

The image processing apparatus according to [A7], wherein, if the measuring device scans the region selected by the selecting device in a plurality of scanning directions, the eliminating device calculates a value of fog at a position at which the plurality of scanning directions intersect with each other on the basis of a plurality of functions, which correspond to the plurality of scanning directions, estimated by the estimating device.

[A9]

A computer readable medium storing a program causing a computer to execute a process, the process comprising:
receiving an image;
extracting regions from the received image;

selecting a region from among the extracted regions in accordance with a predetermined rule;

measuring luminance values of pixels contained in the selected region;

estimating a function representing a degree of fog in the received image from the measured luminance values of the pixels; and eliminating fog from the received image on the basis of the estimated function.

[B1]

An image processing apparatus comprising:

a receiving device that receives an image;

an estimating device that estimates, for each of pixels within the image received by the receiving device, on the basis of the image received by the receiving device, an amount of fog, which is a difference between a luminance value of the pixel and an original luminance value of the pixel;

a measuring device that measures, for each of the pixels within the image received by the receiving device, a luminance value of the pixel;

a determining device that determines a correction target value for luminance values of pixels of a background portion within the image received by the receiving device; and a correcting device that corrects the luminance value of each of the pixels measured by the measuring device on the basis of the amount of fog estimated by the estimating device and the correction target value determined by the determining device.

[B2]

The image processing apparatus according to [B1], wherein the correcting device sets, as a basic amount of correction, a difference between the amount of fog estimated by the estimating device and the correction target value determined by the determining device, and changes the basic amount of correction by using a coefficient which is based on a difference between the luminance value measured by the measuring device and the amount of fog, so as to correct the luminance value on the basis of the changed basic amount of correction.

[B3]

The image processing apparatus according to [B2], wherein the correcting device sets the coefficient such that, as the difference between the luminance value measured by the measuring device and the amount of fog increases, the basic amount of correction decreases.

[B4]

The image processing apparatus according to [B2] or [B3], wherein the correcting device does not correct the luminance value when the difference between the luminance value measured by the measuring device and the amount of fog is equal to or greater than a predetermined threshold or the difference is greater than the predetermined threshold.

[B5]

The image processing apparatus according to one of [B2] to [B4], wherein the correcting device changes the basic amount of correction by using a coefficient which is based on the basic amount of correction and the difference between the luminance value measured by the measuring device and the amount of fog.

[B6]

The image processing apparatus according to one of [B1] to [B5], further comprising:

a judging device that judges, on the basis of a difference between the amount of fog estimated by the estimating device and the correction target value determined by the determining device, whether to correct the luminance value of each of the pixels by using the correcting device, wherein the correcting device corrects the luminance value of each of the pixels when the judging device judges that the luminance value is to be corrected.

[B7]

The image processing apparatus according to one of [B1] to [B5], further comprising:

a judging device that judges, on the basis of a difference between the amounts of fog, estimated by the estimating device, of the pixels within the image received by the receiving device, whether to correct the luminance value of each of the pixels by using the correcting device, wherein the correcting device corrects the luminance value of each of the pixels when the judging device judges that the luminance value is to be corrected.

[B8]

An image processing apparatus comprising:

a receiving device that receives an image;

an extracting device that extracts regions from the image received by the receiving device;

a selecting device that selects a region from among the regions extracted by the extracting device in accordance with a predetermined rule;

a measuring device that measures luminance values of pixels contained in the region selected by the selecting device;

an estimating device that estimates a function representing a degree of fog in the image received by the receiving device from the luminance values of the pixels measured by the measuring device;

a determining device that determines a correction target value for luminance values of pixels of a background portion within the image received by the receiving device; and a correcting device that calculates an amount of fog on the basis of the function estimated by the estimating device and corrects the luminance values of the pixels measured by the measuring device on the basis of the calculated amount of fog and the correction target value determined by the determining device.

[B9]

The image processing apparatus according to [B8], further comprising:

a judging device that calculates an amount of fog on the basis of the function estimated by the estimating device and judges whether to correct the luminance values of the pixels by using the correcting device, on the basis of a difference between the calculated amount of fog and the correction target value determined by the determining device, wherein the correcting device corrects the luminance values of the pixels when the judging device judges that the luminance values are to be corrected.

[B10]

The image processing apparatus according to [B8], further comprising:

a judging device that calculates amounts of fog on the basis of the function estimated by the estimating device and judges whether to correct the luminance values of the pixels by using the correcting device, on the basis of a difference between the calculated amounts of fog of the pixels within the image received by the receiving device, wherein the correcting device corrects the luminance values of the pixels when the judging device judges that the luminance values are to be corrected.

[B11]

A computer readable medium storing a program causing a computer to execute a process, the process comprising:

receiving an image;

estimating, for each of pixels within the received image, on the basis of the received image, an amount of fog, which is a difference between a luminance value of the pixel and an original luminance value of the pixel;

measuring, for each of the pixels within the received image, a luminance value of the pixel;

determining a correction target value for luminance values of pixels of a background portion within the received image; and correcting the measured luminance value of each of the pixels on the basis of the estimated amount of fog and the determined correction target value.

[B12]

A computer readable medium storing a program causing a computer to execute a process, the process comprising:

receiving an image;

extracting regions from the received image;

selecting a region from among the extracted regions in accordance with a predetermined rule;

measuring luminance values of pixels contained in the selected region;

estimating a function representing a degree of fog in the received image from the measured luminance values of the pixels;

determining a correction target value for luminance values of pixels of a background portion within the received image; and calculating an amount of fog on the basis of the estimated function and correcting the measured luminance values of the pixels on the basis of the calculated amount of fog and the determined correction target value.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
a receiving device that receives an image;
an estimating device that estimates, for each of pixels within the image received by the receiving device, on the basis of the image received by the receiving device, an amount of fog, which is a difference between a luminance value of the pixel and an original luminance value of the pixel;
a measuring device that measures for each of the pixels within the image received by the receiving device, a chroma value of the pixel;
a determining device that determines a correction target value for luminance values of pixels of a background portion within the image received by the receiving device; and
a correcting device that corrects the chroma value of the pixel measured by the measuring device on the basis of the amount of fog estimated by the estimating device, the correction target value determined by the determining device, and a distance from the chroma value to an achromatic color,
wherein the correcting device corrects the chroma value of the pixel on the basis of a difference between the amount of fog estimated by the estimating device and the correction target value determined by the determining device.

2. An image processing apparatus comprising:
a receiving device that receives an image;
an estimating device that estimates, for each of pixels within the image received by the receiving device, on the basis of the image received by the receiving device, an amount of fog, which is a difference between a luminance value of the pixel and an original luminance value of the pixel;
a measuring device that measures, for each of the pixels within the image received by the receiving device, a chroma value of the pixel;
a determining device that determines a correction target value for luminance values of pixels of a background portion within the image received by the receiving device; and
a correcting device that corrects the chroma value of the pixel measured by the measuring device on the basis of the amount of fog estimated by the estimating device, the correction target value determined by the determining device, and a distance from the chroma value to an achromatic color,
wherein the correcting device corrects the chroma value of the pixel such that, as the chroma value measured by the measuring device is closer to the achromatic color, the amount of correction for the chroma value decreases, and
wherein the correcting device corrects the chroma value of the pixel on the basis of a difference between the amou of fog estimated by the estimating device and the correction target value determined by the determining device.

3. An image processing apparatus comprising:
a receiving device that receives an image;
an estimating device that estimates, for each of pixels within the image received by the receiving device, on the basis of the image received by the receiving device, an amount of fog, which is a difference between a luminance value of the pixel and an original luminance value of the pixel;
a measuring device that measures, for each of the pixels within the image received by the receiving device, a chroma value of the pixel;
a determining device that determines a correction target value for luminance values of pixels of a background portion within the image received by the receiving device; and
a correcting device that corrects the chroma value of the pixel measured by he measuring device on the basis of the amount of fog estimated by the estimating device, the correction target value determined by the determining device, and a distance from the chroma value to an achromatic color,
wherein the correcting device corrects the chroma value of each of the pixels on the basis of a difference between the amounts of fog, estimated by the estimating device, of the pixels within the image received by the receiving device.

4. An image processing apparatus comprising:
a receiving device that receives an image;
an estimating device that estimates, for each of pixels within the image received by the receiving device, on the basis of the image received by the receiving device, an amount of fog, which is a difference between a luminance value of the pixel and an original luminance value of the pixel;

a measuring device that measures, for each of the pixels within the image received by the receiving device, a chroma value of the pixel;

a determining device that determines a correction target value for luminance values of pixels of a background portion within the image received by the receiving device; and a correcting device that corrects the chroma value of the pixel measured b the measuring device on the basis of the amount of fog estimated by the estimating device, the correction target value determined by the determining device, and a distance from the chroma value to an achromatic color, wherein the correcting device corrects the chroma value of the pixel such that, as the chroma value measured by the measuring device is closer to the achromatic color, the amount of correction for the chroma value decreases, and wherein the correcting device corrects the chroma value of each of the pixels on the basis of a difference between the amounts of fog, estimated by the estimating device, of the pixels within the image received by the receiving device.

5. An image processing apparatus comprising:

a receiving device that receives an image;

an estimating device that estimates, for each of pixels within the image received by the receiving device, on the basis of the image received by the receiving device, an amount of fog, which is a difference between a luminance value of the pixel and an original luminance value of the pixel;

a measuring device that measures, for each of the pixels within the image received by the receiving device, a luminance value and a chroma value of the pixel;

a determining device that determines a correction target value for luminance values of pixels of a background portion within the image received by the receiving device;

a first correcting device that corrects the chroma value of the pixel measured by the measuring device on the basis of the amount of fog estimated by the estimating device, the correction target value determined by the determining device, and a distance from the chroma value to an achromatic color; and a second correcting device that corrects the luminance value of the pixel measured by the measuring device on the basis of the amount of fog estimated by the estimating device and the correction target value determined by the determining device, wherein the first and second correcting devices respectively correct the chroma value and the luminance value of the pixel on the basis of a difference between the amount of fog estimated by the estimating device and the correction target value determined the determining device.

6. An image processing apparatus comprising:

a receiving device that receives an image;

an estimating device that estimates, for each of pixels within the image received by the receiving device, on the basis of the image received b the receiving device, an amount of fog, which is a difference between a luminance value of the pixel and an original luminance value of the pixel;

a measuring device that measures, for each of the pixels within the image received by the receiving device, a luminance value and a chroma value of the pixel;

a determining device that determines a correction target value for luminance values of pixels of a background portion within the image received by the receiving device;

a first correcting device that corrects the chroma value of the pixel measured by the measuring device on the basis of the amount of fog estimated by the estimating device, the correction target value determined by the determining device, and a distance from the chroma value to an achromatic color; and a second correcting device that corrects the luminance value of the pixel measured by the measuring device on the basis of the amount of fog estimated by the estimating device and the correction target value determined by the determining device, wherein the first and second correcting devices respectively correct the chroma value and the luminance value of each of the pixels on the basis of a difference between the amounts of fog, estimated by the estimating device, of the pixels within the image received by the receiving device.

7. An image processing apparatus comprising:

a receiving device that receives an image;

an extracting device that extracts regions from the image received by the receiving device;

a selecting device that selects a region from among the regions extracted by the extracting device in accordance with a predetermined rule;

a measuring device that measures a luminance value and a chroma value of each of pixels contained in the region selected by the selecting device;

an estimating device that estimates a function representing a degree of fog in the image received by the receiving device fix the luminance value of each of the pixels measured by the measuring device;

a determining device that determines a correction target value for luminance values of pixels of a background portion within the image received by the receiving device;

first correcting device that calculates an amount of fog on the basis of the function estimated by the estimating device and that corrects the chroma value of each of the pixels measured by the measuring device on the basis of the calculated amount of fog, the correction target value determined by the determining device, and a distance from the chroma value to an achromatic color; and a second correcting device that calculates an amount of fog on the basis of the function estimated by the estimating device and that corrects the luminance value of each of the pixels measured by the measuring device on the basis of the calculated amount of fog and the correction target value determined by the determining device, wherein the first and second correcting devices respectively correct the chroma value and the luminance value of each of the pixels on the basis of a difference between a calculated amount of fog, calculated according to the function estimated by the estimating device, and the correction target value determined by the determining device.

8. An image processing apparatus comprising:

a receiving device that receives an image;

an extracting device that extracts regions from the image received by the receiving device;

a selecting device that selects a region from among the regions extracted by the extracting device in accordance with a predetermined rule;

a measuring device that measures a luminance value and a chroma value of each of pixels contained in the region selected by the selecting device;

an estimating device that estimates a function representing a degree of fog in the image received by the receiving device from the luminance value of each of the pixels measured by the measuring device;

a determining device that determines a correction target value for luminance values of pixels of a background portion within the image received by the receiving device;

a first correcting device that calculates an amount of fog on the basis of the function estimated by the estimating device and that corrects the chroma value of each of the pixels measured by the measuring device on the basis of the calculated amount of fog the correction target value determined by the determining device, and a distance from the chroma value to an achromatic color; and a second correcting device that calculates an amount of fog on the basis of the function estimated by the estimating device and that corrects the luminance value of each of the pixels measured by the measuring device on the basis of the calculated amount of fog and the correction target value determined by the determining device a judging device that calculates amounts of fog on the basis of the function estimated by the estimating device and that judges, on the basis of a difference between the calculated amounts of fog of the pixels within the image received by the receiving device, whether to correct the chroma value and the luminance value of each of the pixels by using the first and second correcting devices, respectively, wherein the first and second correcting devices respectively correct the chroma value and the luminance value of each of the pixels on the basis of a difference between calculated amounts of fog of the pixels, calculated according to the function estimated by the estimating device, within the image received by the receiving device.

* * * * *